United States Patent

Eckel et al.

[11] Patent Number: 6,122,678
[45] Date of Patent: Sep. 19, 2000

[54] LOCAL NETWORK BASED MULTIPLE SENSOR DEVICE WITH ELECTRICAL LOAD CONTROL MEANS AND WITH TEMPERATURE SENSOR THAT IS EXPOSED TO AMBIENT AIR BY DIFFUSION

[75] Inventors: David P. Eckel, Eaton's Neck; Gaetano Bonasia, Bronx; James A. Porter, Farmingdale, all of N.Y.

[73] Assignee: Leviton Manufacturing Co., Inc., Little Neck, N.Y.

[21] Appl. No.: 09/243,276

[22] Filed: Feb. 2, 1999

Related U.S. Application Data

[60] Provisional application No. 60/085,814, May 18, 1998.

[51] Int. Cl.[7] .................................................. G08B 13/00
[52] U.S. Cl. ........................... 710/15; 700/277; 374/138; 374/142; 374/208; 340/567; 340/584; 340/600
[58] Field of Search .................................... 374/138, 142, 374/208; 340/533, 539, 567, 584, 600; 700/277; 710/15

[56] References Cited

U.S. PATENT DOCUMENTS

| | | | |
|---|---|---|---|
| 3,817,453 | 6/1974 | Pinckaers | 236/68 C |
| 3,898,884 | 8/1975 | Hopkins et al. | 374/189 |
| 4,881,822 | 11/1989 | Ridenour | 374/109 |
| 5,141,332 | 8/1992 | Bergstein | 374/135 |
| 5,473,752 | 12/1995 | Beistle et al. | 714/4 |
| 5,602,745 | 2/1997 | Atchley et al. | 705/413 |
| 5,699,243 | 12/1997 | Eckel et al. | 364/140 |
| 5,739,753 | 4/1998 | Porter | 340/555 |
| 5,764,146 | 6/1998 | Baldwin et al. | 340/567 |
| 5,772,326 | 6/1998 | Batko et al. | 374/142 |
| 5,971,597 | 10/1999 | Baldwin et al. | 700/277 |

*Primary Examiner*—Thomas C. Lee
*Assistant Examiner*—Albert Wang
*Attorney, Agent, or Firm*—Paul J. Sutton

[57] ABSTRACT

A multifunction sensor device which provides various transducer functions including means for performing temperature sensing, ambient light sensing, motion detection, switching functions and a means to put the device in an on, off or auto mode. The device has utility in environments such as that found in offices, schools, homes, industrial plants or any other type of automated facility in which sensors are utilized for energy monitoring and control, end user convenience or HVAC control. Key elements of the invention include overcoming the difficulty of mounting diverse sensors or transducers within the same device or housing; permitting these various sensors to exist in a single package that can be mounted to a wall in a substantially flush manner; and eliminating the requirement of an air flow channel in the device, thus minimizing any adverse effects on the motion detecting element or sensor as well as providing built in partial hysteresis. The device may include additional transducers or sensors and is constructed such that the temperature sensor is neither exposed to the flow of air in a room or area nor in an airflow channel whereby a chimney effect may occur. The device has a passive alcove or cavity that acclimates to the ambient air temperature through the process of diffusion. The device can transmit and receive real time data, relative data and actual discrete data in addition to switching and controlling loads locally or remotely.

83 Claims, 19 Drawing Sheets

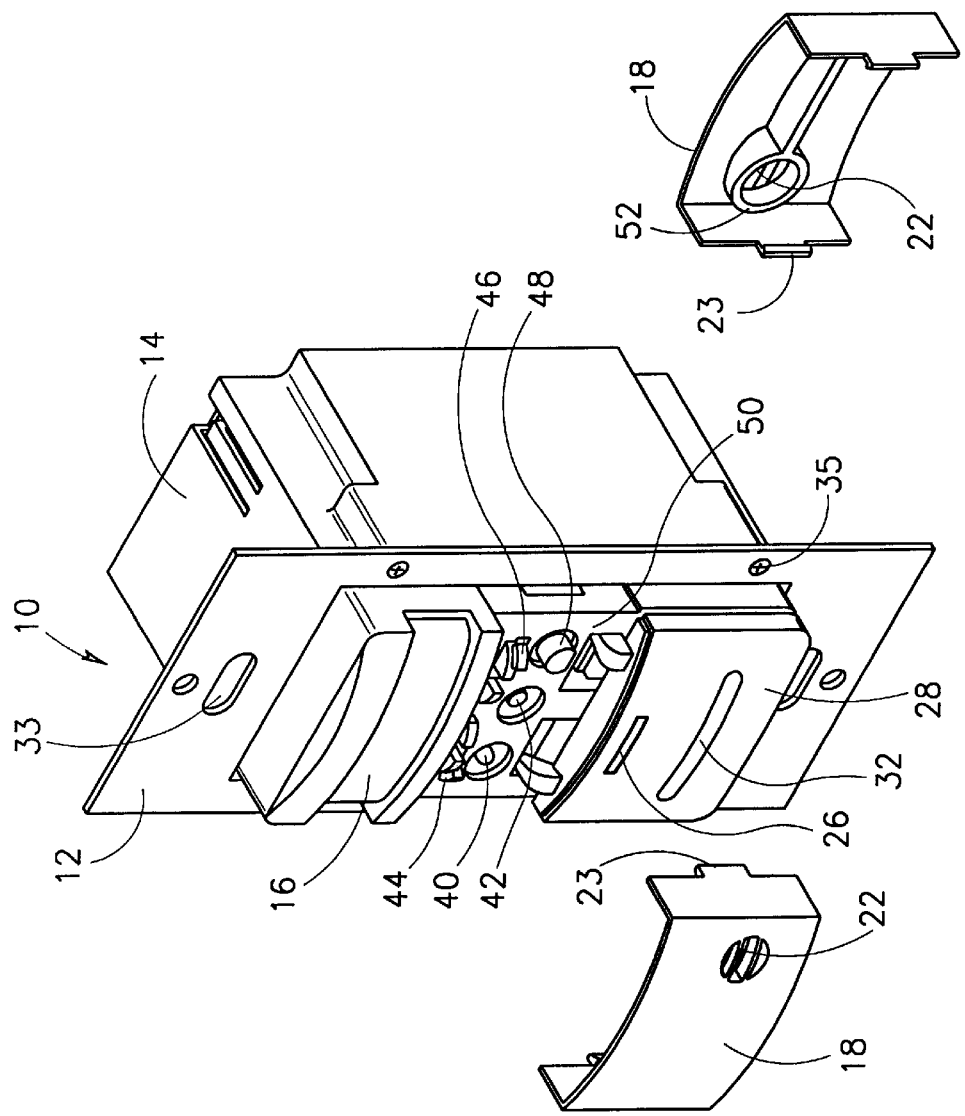
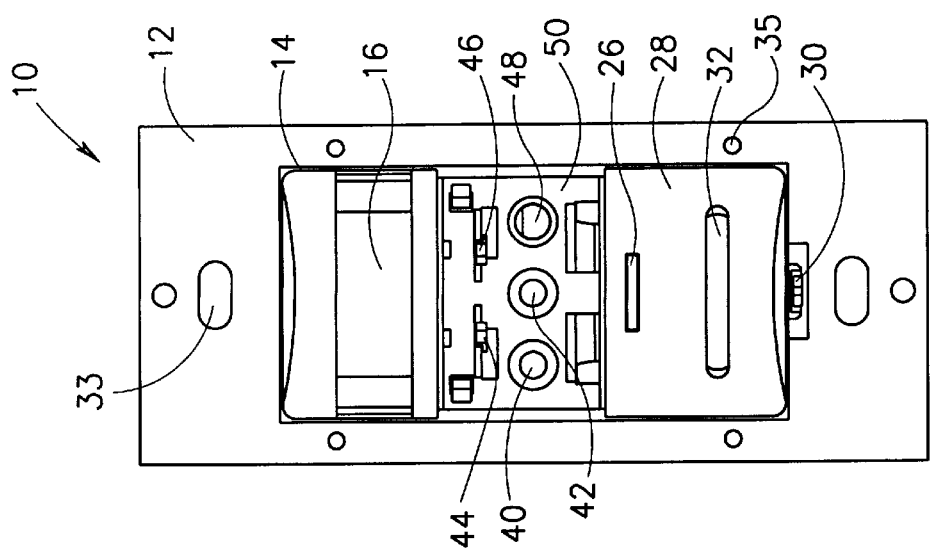

LOCAL NETWORK BASED MULTIPLE SENSOR DEVICE WITH ELECTRICAL LOAD CONTROL MEANS AND WITH TEMPERATURE SENSOR THAT IS EXPOSED TO AMBIENT AIR BY DIFFUSION

REFERENCE TO RELATED APPLICATIONS

This application claims the benefit of U.S. Provisional Patent Application Ser. No. 60/085,814, filed May 18, 1998.

FIELD OF THE INVENTION

The present invention relates generally to the field of electrical sensors and more particularly to a network based multi-function sensor suitable for sensing motion, temperature and ambient light and which include blinder devices for reducing nuisance tripping of the device.

BACKGROUND OF THE INVENTION

Today, automation systems are being installed in more and more buildings, including both new construction and in structures that are being rebuilt. The incentives for putting automation systems into a building are numerous. High on the list are reduced operating costs, more efficient use of energy, simplified control of building systems, ease of maintenance and of effecting changes to the systems. Facility managers would prefer to install systems that can interoperate amongst each other. Interoperability is defined by different products, devices and systems for different tasks and developed by different manufacturers, can be linked together to form flexible, functional control networks.

An example of a typical automation system includes lighting controls, HVAC systems, security systems, fire alarm systems and motor drives all possibly provided by different manufacturers. It is desirable if these separate disparate systems can communicate and operate with each other.

Prior art automation systems generally comprised closed proprietary equipment supplied by a single manufacturer. With this type of proprietary system, the installation, servicing and future modifications of the component devices in the system were restricted to a single manufacturer's product offering and technical capability. In addition, it was very difficult or impossible to integrate new technology developed by other manufacturers. If technology from other manufactures could be integrated, it was usually too costly to consider.

Thus, it is desirable to create an open control system whereby individual sensors, processors and other components share information among one another. A few of the benefits of using an open system include reduced energy costs, increased number of design options for the facility manager, lower design and installation costs since the need for customized hardware and software is greatly reduced and since star configuration point to point wiring is replaced by shared media and lastly, system startup is quicker and simpler.

In addition, expansion and modification of the system in the future is greatly simplified. New products can be introduced without requiring major system redesign or reprogramming.

An integral part of any automation control system are the sensors and transducers used to gather data on one or more physical parameters such as temperature and motion. It would be desirable if a plurality of sensor functions could be placed in a single device, fit in a standard single wall box opening and be able to communicate with one or more control units, i.e., processing nodes, on the control network.

The number and types of sensors in this device could be many including multiple, dual or singular occupancy and security sensing via means including passive infrared, ultrasonic, RF, audio or sound or active infrared. In addition, other multiple or singular transducers may be employed such as temperature sensor, relative humidity sensor, ambient light sensor, CO sensor, smoke sensor, security sensor, air flow sensors, switches, etc.

The utility of such a multifunction sensor can best be described by an example. In order to minimize the number of unique devices that are installed in a room, it is desirable to have a sensor device reliably perform as many functions as possible as this reduces the wiring costs as well as the number of devices required to be installed on the walls of the room. Additionally, from an aesthetic point of view, architects are under increasing demand by their clients to reduce the number of unique sensor nodes in any given room.

Further, it is also desirable to have these transducers or sensors communicate with a microprocessor or microcontroller that can be used to enhance the application of the transducer. This may be accomplished by providing the necessary A/D functions, including sensitivity and range adjustments of the transducer functions, and also by enabling the sensed information to be communicated over a bus or other media using a suitable protocol.

Further, calibration, either in the field or the factory could be employed to generate either a relative or real absolute temperature reading. Further, the control of any HVAC equipment could be performed either locally at the sensor node or at a remote location. Also, the sensor devices could be used to control the lights in and outside the room and building, control the HVAC control in and outside the room and building, send signals to or control the fire alarm and security alarm systems, etc.

It is also desirable to enable the device to communicate any of the standard protocols already in use such as Echelon LonWorks, CEBus, X10, BACNet, CAN, etc. Some examples of the media include twisted pair, power line carrier, optical fiber, RF, coaxial, etc.

The device thus preferably can transmit data or commands, receive data or commands, activate and switch local or remote loads or control devices, use and/or generate real time or relative readings, be calibrated externally in an automatic self adjusting way, calibrated externally or via an electronic communications link.

Additionally, the device preferably is able to minimize or eliminate effects from its internal circuitry that may interfere with the temperature reading of the temperature sensor. Also, the device preferably has the ability to detect if there are adverse air flows emanating from the mounting hole in the wall or other surface which could cause erroneous temperature and humidity measurements.

It is desirable if the device is mounted in a location that is exposed to the air in the environment of the room or area being monitored. The motion detector transducer and sensor circuit is preferably mounted in a manner such that it is not exposed to (1) the air flow from the environment being monitored and (2) the air flow which may be created when the device is mounted in or on a hole in the wall. Further, the hole in the wall is often created when the device is mounted on a wall in a home or office building. The hole may function to create a chimney effect given the right conditions. It is thus desirable to mount the temperature sensor in a way which offers some shielding or insulation from direct exposure to heating or air ducts as well as any other undesirable heating or cooling sources such as direct sunlight, fans, HVAC ducts, etc.

SUMMARY OF THE INVENTION

The present invention is a multifunction sensor device that provides various transducer functions. In particular, the device comprises a means for performing temperature sensing, ambient light sensing, motion detection, switching functions and a means to put the device in an on, off or auto mode. Such a device has utility in environments such as that found in offices, schools, homes, industrial plants or any other type of automated facility in which sensors are utilized for energy monitoring and control, end user convenience or HVAC control.

Key elements of the present invention include (1) overcoming the difficulty of mounting diverse sensors or transducers within the same device or housing, (2) permitting these various sensors to exist in a single package that can be mounted to a wall in a substantially flush manner and (3) eliminating the requirement of an air flow channel in the device, thus minimizing any adverse effects on the motion detecting element or sensor as well as providing built in partial hysteresis and practical latency.

A prime objective of the present invention is to provide a flush or surface mounted temperature and motion detection sensor in a single device. The device may include additional transducers or sensors and is constructed such that the temperature sensor is neither exposed to the flow of air in a room or area nor in an airflow channel whereby a chimney effect may occur. To avoid these conditions from occurring, the temperature-sensing element is placed in a cavity that is coupled to the environment. Thus, the temperature of the air in the cavity changes via diffusion with the temperature in the surrounding environment. In addition, the temperature sensing element, e.g., passive or active infrared sensor is mounted so as to be shielded from exposure to direct sunlight and so as not to be exposed to a flow of air from the environment being monitored.

Further, the vents provided for the temperature sensing element functions as a baffle to provide hysteresis. The hysteresis provides additional utility for the device in that the temperature sensing element is mounted within, beneath, part of, or on the housing in such a way that the chimney effects due to airflow in the wall or from heating or cooling ducts nearby are reduced or eliminated in a fashion that is similar to a "smoothing" or softening affect and can be adjusted mechanically and/or electronically through hardware or software such that the hysteresis can be "settable" to any achievable value and could even approach zero hysteresis if desired. Note that the temperature sensor module can be incorporated in a flush mount device, wall or surface mount device or ceiling device. Further, since an air channel is not required or used the device can be mounted flush in a single or multiple gang electrical box.

Another objective of the present invention is to provide a means of temperature sensing utilizing multiple technologies including RTD, PRTD, thermisters, digital temperature sensors, PWM sensors, silicon sensors, capacitive and polymer sensors, etc. One or more sensors can be used in the circuits that are coupled to a microprocessor or microcontroller. The sensor is positioned in a modular temperature chamber that permits the temperature sensor to acclimate to the ambient air temperature in the surrounding environment. Access to the temperature sensor is simply achieved by removal of a cover or panel without the need for special tools.

The microcontroller is utilized to provide the capability of transmitting and receiving real time data, relative data and actual discrete data in addition to switching and controlling loads locally or remotely. Data can be sent and received from other devices that are part of the distributed or centralized control system wherein device communicate with each other using standard protocols such as Echelon LonWorks, CEBus, X10, BACNet, CAN, etc. The media utilized may comprise twisted pair, power line carrier, RF, optical fiber, coaxial, etc.

The device also has the capability of self-calibration of the sensors under either local or remote control. For example, if the device is exposed to two different known temperatures, then the equation of a line including the slope and relative offset connecting the two points can be generated. This procedure can be performed once and either actual or relative readings can be calibrated within the operating range of the device. In addition, points can be recorded and used to provide additional accuracy or to extend the range of the temperature sensor. Further, a piece-wise linear equation and look up table can be generated which is used to linearize the accuracy or sensitivity of the temperature sensing element and associated circuitry. In addition, local test resistors or potentiometers can be used to adjust the range, sensitivity or accuracy of the sensor.

Another key element of the device is that the temperature sensor does not have an air flow channel that permits air to circulate through the sensor module housing. Rather, the device has a passive alcove or cavity that acclimates to the ambient air temperature through the process of diffusion. In addition, the device incorporates a vent that permits any heat generated by electronics or components to escape without adversely affecting the temperature sensor and passive infrared sensor. In addition, this permits any chimney effects generated by the hole in the wall to be measured by the device.

The device incorporates a temperature sensor transducers and sensing circuit that is mounted in the sensor device housing in a location that is exposed to the air in the room but not to air circulating internally within the device housing. A passive or active infrared sensor or ultrasonic sensor is also mounted within the device housing with or without an insulating layer of material or conformal coating located such that it is not adversely affected by the venting of heat generating components or the chimney effects generated by the mounting hole and the vent.

The device also comprises airflow vents on the top of the device housing to provide a venting means for any components that generate heat within the device. These vents also provide airflow from the mounting hole or the channel between the studs commonly found behind a wall within a building or wall. This flow of air provides for additional cooling of heat generating components in the device and ensures that the temperature and motion detection sensors are not adversely effected by this airflow.

Optionally, a sensor could be used to measure this air flow which could subsequently be used for building maintenance purposes, i.e., to notify the building owner of the location of air leaks within the walls of the building. Note that in most building, insulation is placed in the wall of a building to reduce the hot or cold air losses thus saving utility expenses. In this case, the device can be used to detect and measure the airflow that occurs in a wall and notify building personnel that a wall in which the device is mounted does not have adequate insulation and/or is not properly sealed. The vents could also be provided on any other surface of the device including opposite side surfaces or the bottom of the housing to provide additional or alternate venting.

The device also may include provisions for surface wiring and various types of mounting means. Included as well is an optional positive screw mounting. The mounting means could be directly on a wall, on a modular furniture channel or on or in a single gang wall box. The electrical connections can be made using flying leads or an RJ-11 or RJ-45 jack.

A lens is positioned in front of the infrared detector to focus infrared radiation and to prevent the ambient air from entering the device either from the temperature and humidity chamber or the heat vent. The lens may or may not include blinders.

Note that device may or may not have temperature sensing capability. Optionally, the front PC board containing the passive infrared transducer and the temperature sensor is installed using a layer of glue, foam or other gasket material to isolate the temperature sensor transducer and the infrared sensor from the back boards and the air channel created by the heat vent and the hole in the wall.

Optionally, two infrared sensing elements can be mounted on the same side of the printed circuit board. Partitioning of the two sensors can be performed arbitrarily as long as the passive infrared sensor is not exposed to erroneous air flows created by a natural or artificial air channel from the vents in the housing, the hole in the wall or the vents for the temperature chamber. Further, the motion sensing transducer is preferably not exposed to airflow or any other environmental conditions that could cause adverse behavior to the performance of the device. The temperature sensor is isolated with the absence of airflow over or around the infrared sensor. The housing is constructed such that it provides a chamber permitting the temperature to adjust naturally to the ambient air temperature to which it is exposed by the process of diffusion. This is accomplished by the use of the housing and a cover plate that is positioned over the temperature-sensing element. Foam or insulating material may optionally be used since the temperature element is not in a channel where air is circulating, but rather is in an alcove chamber that acclimates to the environment.

In another optional embodiment, the passive or active infrared and temperature sensors are on opposite sides of the printed circuit board or on different boards such that the air around the temperature sensor and the passive or active infrared sensor are isolated from one another by the nature of their location.

The device may incorporate at least one vent on the face of the device to allow the ambient air outside to acclimate with that of the temperature chamber. Thus, the temperature sensor may be located centrally behind the vents or louvers or anywhere within the area. In addition, the sensitivity, range, response time and accuracy may be adjusted mechanically, via the use of different housing and vent shapes and materials and also by electronic means.

Further, the device may incorporate adjustable louvers or vents over the temperature sensor create a baffle or regulator to adjust how quickly or slowly the temperature transducer will adjust to the ambient air. Also, the sensitivity, range, response time and accuracy can be adjusted by adapting the layout, position and design of the vents or louvers. It is also within the scope of the invention that mechanical or electronic means may be provided that open or close shudders on the vents over the temperature sensor.

Optionally, the device may incorporate fixed vents over the temperature sensor which create a fixed baffle or regulator thus determining a fixed means for how quickly or slowly the temperature transducer will adjust to the ambient air. The sensitivity, range, response time and accuracy, however, can still be adjusted by using different materials, thickness and shapes and by locating the sensor in different locations and orientations.

In another optional embodiment the device does not incorporate any vents and the temperature sensor is attached to the cover. In this case, the outside ambient air will be measured by measuring the inside surface temperature of the cover or plate. Therefore, the temperature sensing transducer is not directly exposed to any outside air. Also, the sensitivity, range, response time and accuracy may be adjusted using different materials, thickness and shapes and by locating the sensors in different locations or orientations.

In yet another optional embodiment of the invention the device does not incorporate vents and the temperature sensor is mounted on the surface of the device or in an alcove and exposed directly to the air. The outside ambient air is measured by measuring the air temperature of the outside air. Therefore, the temperature sensing transducer is directly exposed to the outside air. In addition, the sensitivity, range, response time and accuracy may be adjusted using different materials, thickness and shapes and by locating the sensors in different locations or orientations. Also, heat sinks can be added or connected to the sensor body and/or the leads and brought out of the device so as to improve the overall temperature response of the transducer and the device.

In still another optional embodiment of the invention the device does not incorporate vents and the temperature sensor comprises a cover on the device or a portion of the cover of the device and exposed directly to the air. The temperature-sensing element can also be either predominately outside, part of a cover or inside a cover of the device. This allows for very thin sensing materials to be used that are placed directly on the surface of the device, embedded in the layers of the cover of the device or predominately located on the inside portion of the cover of the device. The outside ambient air temperature is measured by measuring the air temperature of the outside air. Therefore, the temperature sensing transducer is directly exposed to the outside air.

In addition, the sensitivity, range, response time and accuracy may be adjusted using different materials, thickness and shapes and by locating the sensors in different locations or orientations. Although the temperature sensing element and housing can take on various forms, some of the types are enclosed. A software algorithm can be optionally employed which functions to correct the hysteresis by adjusting the actual temperature reading and hence approximating the theoretical response of a highly calibrated thermocouple. Additionally, the algorithm can employ programmed undershoots, overshoots, delays, amplitude shifts and a variety of other signal manipulations.

Additionally, since the temperature sensor may be exposed to the open air, a 'fast change algorithm' can be employed which functions to recognize a rapid rate of change of temperature at the sensor, e.g., more than 15 degrees per 10 seconds. The rapid temperature change may either be due to someone placing their finger on the sensor, applying a heat gun, applying a cold compress or may be due to flames from a fire. The software routine, in response the detection of a rapid rate of change in temperature, can either send a warning message over the network or ignore the change in temperature, regarding it as an artificial heat/cold source. The device can be programmed to respond either way, i.e., sending temperature data over the network and having it acted upon or internally filtering it out and ignoring it.

In another embodiment the cover over the temperature sensor is removable. The cover can be adapted to either require or not require a tool for removal. Alternatively, the cover can be fixable attached to the device. In either embodiment, the temperature sensing transducer and/or other components of the temperature sensing circuit are in a socket which permits replacement with another transducer or component with different parameters. In addition, any local components such as potentiometers, switches, etc. requiring adjustment can be accessed, adjusted or changed.

In one embodiment of the invention the software may be adapted to adjust the sensitivity, response time, accuracy, range, etc. of the temperature sensor element and circuitry. In another embodiment, at least one air vent is provided which exposes both sides of the back PC board to the potential airflow generated when electrical components generate heat. In addition, the temperature chamber may be located in different parts of the device such as centrally or at the top or bottom.

The device may be mounted using a variety of means. These include various mounting plate variations including mounting in a single or multiple gang box, mounting on or in the hole of a module furniture channel, or being hung from underneath a fluorescent or incandescent fixture that is mounted on the desk, wall, floor or modular furniture and mounting on any other suitable surface. In addition, the device contains 'mouse holes' which allow surface wiring to exit the device.

Another mounting option includes a hinged mounting bracket that permits the device to be mounted and electrically connected relatively easily. The mounting means uses either a positive locking screw or a snap fit. The positive locking screw option makes the device more tamperproof. The snap fit option provides a more aesthetically pleasing package.

The multi-sensor device of the present invention forms part of the network control system and generally comprises the following basic elements: (1) user interface, (2) power supply and media connections, (3) communications media and protocol and (4) one or more sensor inputs.

Additionally, functions can be performed which include some type of annunciation either by sound by using a buzzer or by sight by employing LEDs or controlling the lights in the room. For example, if the smoke detector transducer detects a fire, a buzzer could perform local annunciation. Alternatively, it could illuminate a visual indication, e.g., specially designed lights, LEDs, etc. for people that are hearing impaired. Also, a signal can be sent to a control unit or lamp actuator to flash one or more lights in the event that fire is detected for the benefit of the hearing impaired.

The power supply component for some of the devices in the system may include means to operate from 100 to 305 VAC. This type of device supplies an output voltage between 8 and 26 VDC. Alternatively, the device may omit a power supply that converts utility power but rather is adapted to receive power from another device that does incorporate a power supply that operates from 100 to 305 VAC. The means for distributing the electrical power to other devices could be accomplished via any suitable means including twisted pair cabling, electrical power line cables or any other power carrying media.

Another key feature of the system is a communications media and protocol that together form a communications network allowing messages to be communicated (1) between devices within the system and (2) between devices located within the system and devices located external to the system. The messages comprise, among other things, commands for controlling and/or monitoring signals. These messages could be tightly coupled, loosely coupled or of a macro broadcast nature. In addition, they may be one way, bidirectional, with established priorities or without. The network communications medium may comprise, for example, twisted pair Category 5 cabling, coaxial cabling, a standard POTS line, power line carrier, optical fiber, RF or infrared. The medium may be common or it may be shared with the possibility of requiring the use of gateways, routing devices or any other appropriate network device for carrying data signals.

Depending on the type of network medium in use in the system, the devices within the system include, within their housings, a slot that allows for the connection of a bus terminator. The bus terminator is typically an RC network that is connected to the device and serves to mechanically as well as electrically connect the device to the network communication line, e.g., twisted pair, coaxial, optical fiber, etc.

Thus, the system is able communicate to devices within the system to provide intrasystem control and monitoring as well as to communicate outside the system to provide intersystem control and monitoring. Data and/or commands are received and transmitted, real time relative readings can be received and transmitted, devices can be calibrated externally in an automatic self adjusting way or via a communication link over the network.

There is provided in accordance with the present invention a multiple sensor device for use on a local operating network comprising a housing, a communications transceiver for transmitting and receiving data between the multiple sensor device and the local operating network, a motion sensor, an ambient light sensor, a temperature sensor, a cavity within the housing adapted to contain a temperature sensor element such that the temperature sensor element is coupled to the surrounding environment but is neither exposed to the flow of air in the surrounding area nor lies in an airflow channel within the multiple sensor device, the temperature of the air within the cavity changing via diffusion with the air in the surrounding environment, lighting control means for determining the level of electrical power to be applied to a logical lighting load bound to the multiple sensor device, memory means for storing software application code and a controller adapted to execute one or more software applications stored in the memory means, the controller, in combination with the one or more software applications, operative to receive information over the local operating network from one or more electrical devices and to transmit information over the local operating network to one or more electrical devices.

The motion sensor comprises motion sensing circuitry including a passive infrared (PIR) sensor. The ambient light sensor comprises ambient light sensing circuitry including a photodiode. The temperature sensor comprises temperature sensing circuitry including the temperature sensor element. The multiple sensor device further comprises a pedestal within the housing wherein the temperature sensor element is positioned at a distance from a printed circuit board, the pedestal adapted to substantially environmentally seal the cavity from an inner portion of the housing.

The one or more motion detector elements and the temperature sensor element are located on opposite sides of a printed circuit board such that the air around the temperature sensor element and the one or more motion detector elements are isolated from one another by the nature of their location. The one or more motion detector elements and the temperature sensor element are located on different printed circuit boards such that the air around the temperature sensor element and the one or more motion detector elements are isolated from one another by the nature of their location. The housing comprises openings on one side only so as to direct airflow through an area that does not impact any circuitry located therewithin.

The multiple sensor device further comprises relay software application code for controlling the power on/off state of one or more logical lighting loads bound to the multiple sensor device; dimming software application code for providing dimming and brightening control of one or more dimming loads bound to the multiple sensor device; occupancy software application code for controlling a logical lighting load bound to the multiple sensor device in accordance with the detection of motion in an area; California Title 24 software application code for modifying relay and dimming functionality in accordance therewith; ambient light level software application code for maintaining a particular light level within an area; reset software application code for placing the multiple sensor device in an initialization state; go unconfigured software application code for placing the multiple sensor device in an unconfigured state; communication input/output (I/O) software application code for receiving data from and/or transmitting data to the local operating network; and inhibit software application code for inhibiting and overriding the normal operating mode of the multiple sensor device; temperature software application code for measuring the temperature of the area surrounding the multiple sensor device; and fast change application code for detecting rapid increases in temperature and in response thereto sending a warning message over the local operating network.

The local operating network may include twisted pair wiring, radio frequency (RF) communications, infrared communications, optical communication over optical fiber, power line carrier communications, coaxial communications, utilizes standard protocols such as LonWorks, CEBus, X10, BACNet and CAN.

BRIEF DESCRIPTION OF THE DRAWINGS

The invention is herein described, by way of example only, with reference to the accompanying drawings, wherein:

FIG. 3 is a front view illustration of the sensor unit of the present invention with the mid section cover removed;

FIG. 4A is a perspective view illustration of the sensor unit of the present invention with the mid section cover removed;

FIG. 4B is a perspective view of the inside portion of the mid section cover;

DETAILED DESCRIPTION OF THE INVENTION

Notation Used Throughout

Figure 2:
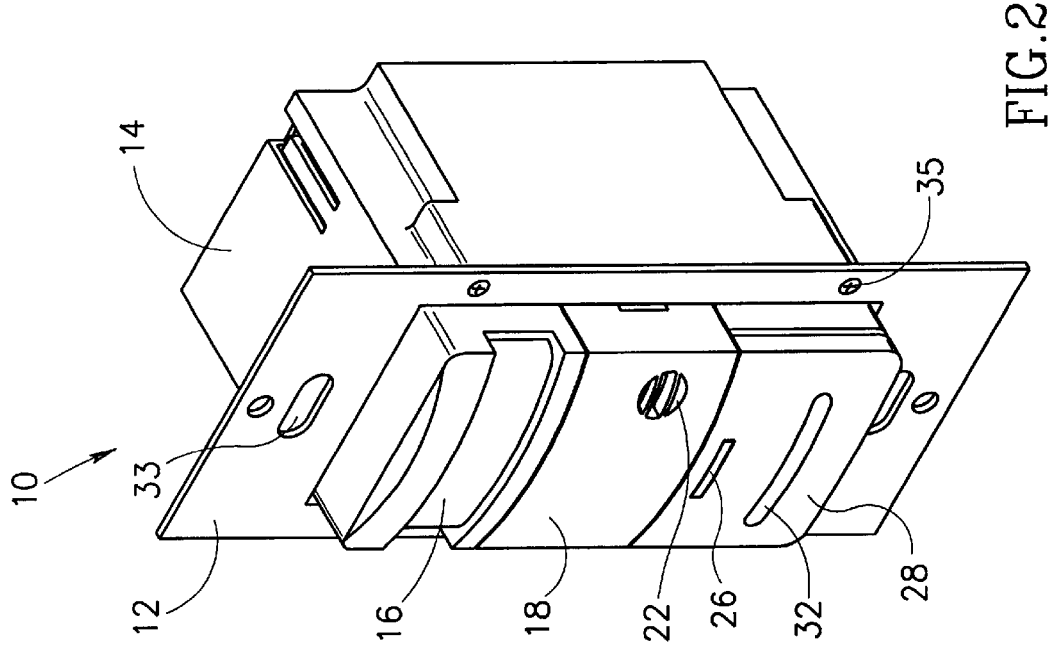
FIG. 2 is a perspective view illustration of the sensor unit of the present invention incorporating a single switch and having the mid section cover in place.

The following notation is used throughout this document.

| Term | Definition |
|---|---|
| AC | Alternating Current |
| BACNet | Building Automation and Control Network (a data communication protocol) |
| CAN | Controller Area Network |
| CEBus | Consumer Electronics Bus |
| CO | Carbon Monoxide |
| EEPROM | Electrically Erasable Programmable Read Only Memory |
| EIA | Electronic Industries Association |
| HVAC | Heating Ventilation Air Conditioning |
| IR | Infrared |
| LED | Light Emitting Diode |
| PC | Printed Circuit |
| PIR | Passive Infrared |
| POTS | Plain Old Telephone Service |
| PRTD | Platinum Resistance Temperature Detector |
| PWM | Pulse Width Modulation |
| RAM | Random Access Memory |
| RC | Resister/Capacitor |
| RF | Radio Frequency |
| ROM | Read Only Memory |
| RTD | Resistance Temperature Detector |
| SNVT | Standard Network Variable Type |

General Description

The present invention comprises a multifunction sensor device incorporating a motion detection sensor, temperature sensor and ambient light sensor. The temperature sensor is exposed to the flow of air or the circulation of air via a vent that allows for air to circulate over the temperature sensor. A key characteristic of the present invention is that the passive infrared device used for motion detection is isolated from the air circulating for the purpose of temperature measurement by the use of a lens and an isolation chamber surrounding the temperature sensor.

The temperature and motion detection sensors may reside on the same or opposite sides of a PC board. If they reside on the same side a partition isolates the two transducers since the temperature sensor is required to have airflow while the passive infrared sensor should not.

The present invention provides an advantage in that it does not require the temperature sensor to be in an air channel or exposed to airflow, i.e., there is no separate entrance and exit of air having an associated speed, direction and force. The present invention does not utilize an airflow channel as used in prior art devices. Rather the device employs the concept of temperature diffusion with natural hysteresis by being exposed to the ambient air and changing in a deliberately slower and lagging manner. This necessitates that no air channel or flow exists from one end of the device to the other.

This device does not require the channeled circulation or flow of air over the temperature sensor that can be analogized to the water flow in an aqueduct that flows in a directional manner with varying directions, speeds and volumes. The present invention, on the other hand, measures temperature in a tidal fashion similar to the way the water in an ocean or harbor moves in and out from the shore. In other words, in one case air is flowing in a channel from one point to another similar to the way water flows in an aqueduct. In the case of the present invention, the air moves in and out of the same opening like that of the rise and fall of the water in the ocean wherein the point of entry and exit for the air is the same.

The phenomenon can also be described as the process of diffusion involving the intermingling of air molecules from outside the device and that of the air around the temperature sensor. Therefore, the temperature sensor and the passive infrared sensor could reside on the same or opposite sides of the PC board. The temperature and passive infrared elements, however, are required to be isolated from any erroneous air flow channels that may be present which could affect the accuracy of the measurements. Thus, the present invention provides a practical solution allowing temperature sensing and PIR motion sensing to reside in the same housing in a device that can be mounted in a single gang box.

Figure 1:
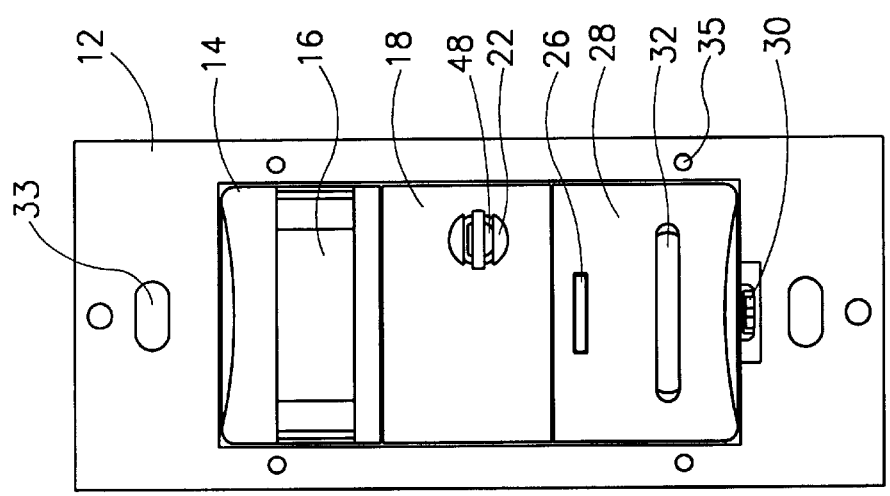
FIG. 1 is a front view illustration of a first embodiment of the sensor unit of the present invention incorporating a single switch and having the mid section cover in place.

A front view illustration of a first embodiment of the sensor unit of the present invention incorporating a single switch and having the mid section cover in place is shown in FIG. 1. The device, generally referenced 10, comprises a housing 14 connected to a mounting plate 12 via one or more fasteners through apertures 35. The housing 14 comprises an aperture covered by a lens or window 16. The aperture is used to house an occupancy sensor, e.g., passive infrared sensor (PIR). Note that the occupancy sensor may comprise one or more PIR detectors, e.g., dual PIR detectors.

A cover 18, which may or may not be removable, is positioned below the motion detection element lens 16. Making the cover 18 removable permits access to adjusting levers or blinds within the device that can be used to adjust the field of view of the PIR detectors in the device. The cover 18 also incorporates an aperture or vent 22 allowing air to diffuse through to an inner chamber housing the temperature sensor 48.

A switch cover or plate 28 having a raised bar portion 32 is located below the cover 18. The switch is used to control a logical load that the device is bound to. The logical load comprises one or more physical electrical loads. When pressed, a message is sent to the control device connected to the load to be switched. The message is interpreted and the control device carries out any required action.

An aperture 26 is located within the switch cover 28 and may optionally include a transparent or translucent window or light pipe therewithin. The aperture 26 provides visual access to a visual indicator such as an LED. The visual indicator is used to provide feedback to the user, e.g., in connection with the status of the bound logical electrical load or the status of occupancy as determined by the PIR sensor.

The device 10 also comprises a switch 30 that provides the user a means for placing the device into one or more modes. Typically, the switch 30 comprises three positions: ON, AUTO and OFF. The ON position turns the logical load on regardless of other inputs, the AUTO position lets the load be controlled by one or more sensor inputs and the OFF position turns the load off regardless of the state of the sensor inputs.

Apertures 33 at the top and bottom of the mounting plate 12 provide a means by which the device may be installed in a single or multiple gang wallbox. Apertures are also included to permit a cover plate (not shown) to be mounted over the device after it is installed in a wallbox.

When the device 10 is installed, for example in a wall, the hole in the wall required for the passage of wiring can either blow or suck air due to the chimney effect. The housing comprises openings in specific places, e.g., only on the top, so as to direct any potential airflow through an area that will not impact the operation of the electronic circuitry. If openings are placed on the top and bottom or not provided at all, this causes air to find its way in or out of the device through incidental openings in the face. This would cause air to flow over the electronic circuitry thus giving false readings, positive or negative.

A perspective view illustration of the sensor unit of the present invention incorporating a single switch and having the mid section cover in place is shown in FIG. 2. A large portion of the housing 14 is shown including the fasteners 35 for connecting the mounting plate 12 onto the housing 14. Shown are the occupancy sensor lens 16, cover 18 permitting access to the adjustable blinders within and vent or aperture 22 for permitting the diffusion of air to the temperature sensor, switch cover 28 including raised bar 32 and light pipe 26 and apertures 35 for affixing the device in single or multiple gang wallbox. Note that in this view, the on/auto/off switch 30 is not visible.

A front view illustration of the sensor unit of the present invention with the mid section cover removed is shown in FIG. 3. The device is shown with a removable cover 18 that has been removed from the housing 14. Visible now are the housing panel 50, service LED 40, service pin (momentary contact switch) 42, temperature sensor 48 and left and right adjusting levers 44, 46, respectively. Also shown are the mounting plate 12, mounting holes 33, PIR detector lens 16, switch cover 28, light pipe 26, switch bar 32, fasteners 35 and mode switch 30.

The blinders themselves are located behind the housing panel 50. The adjusting levers 44, 46, however, extend beyond the surface of the housing panel 50 so as to be accessible to a user. The blinders can be adjusted by moving the adjusting levers left or right along a linear path in the housing panel 50.

A perspective view illustration of the sensor unit of the present invention with the mid section cover removed is shown in FIG. 4A. The removable cover 18 is shown oriented in a removed position from the device 10. The cover comprises vents 22 that are positioned directly over the temperature sensor 48 when the cover 18 is in place in the housing 14. Tabs 23 on either side of the cover 18 secure it to the housing 14.

A perspective view of the inside portion of the mid section cover is shown in FIG. 4B. The cover is constructed to wrap around and enclose the entire width of the housing 14. A cylindrically shaped raised portion 52 extends outward from the inner surface of the cover 18. Located within this cylinder is the vent 22 with openings to permits the temperature sensor to contact the surrounding air. The height of the cylindrical portion 52 is adapted so that the outer surface mates flush with the surface of the housing panel 50 sealing off the temperature sensor from the inner space between the cover 18 and the surface of the housing panel 50.

The vent 22 is shown with openings that are in a horizontal fashion, however, they may be positioned horizontally, vertically or at any angle. Note, however, that the angle of the vent openings could affect the response of the temperature-sensing element by allowing either a more rapid rate of change or a slower rate of change based upon the size, quantity, angle and shape of the openings. This change in the architecture of the vent 22 can be compensated for in the hardware and/or software of the device. The optimum design for maximum performance depends on the given application and desired temperature change per time period.

Figure 5A:
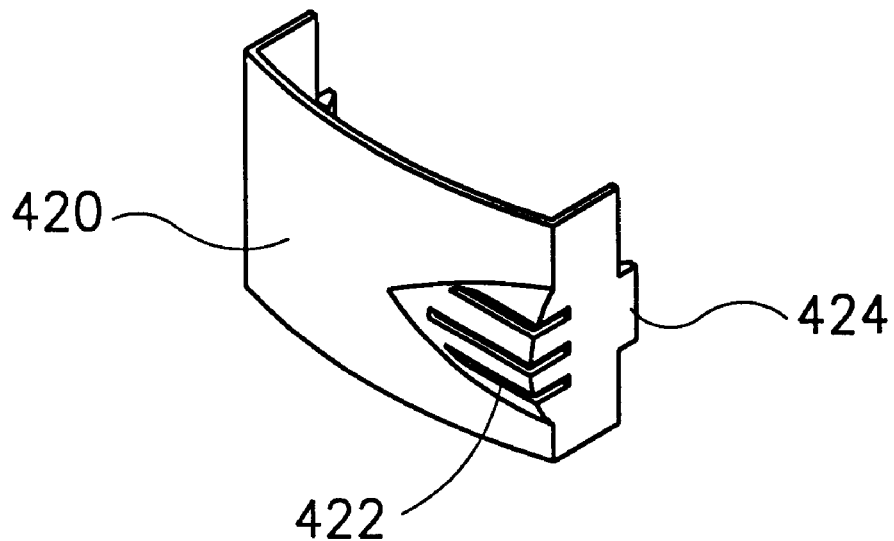
FIG. 5A is a perspective view of an alternative mid section cover.

A perspective view of an alternative mid section cover is shown in FIG. 5A. The alternative cover 420 comprises vent openings 422 that are raised so as to permit the temperature sensor below the cover to be exposed to air on two sides rather than just one. The cover 420 also comprises tabs 424 that function to secure it to the housing panel.

Figure 5B:
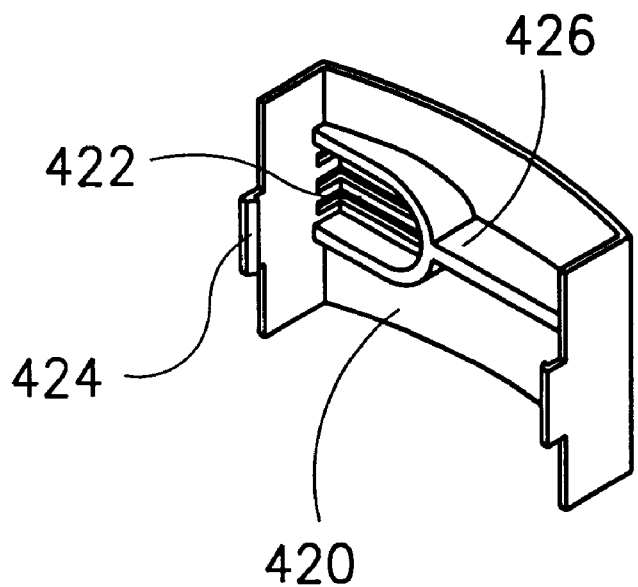
FIG. 5B is a perspective view of the inside portion of the alternative mid section cover.

A perspective view of the inside portion of the alternative mid section cover 420 is shown in FIG. 5B. This inside view of the cover 420 shows the tabs 424, vent openings 422 and a raised rib portion 426 used to both to provide rigidity to the cover and to seal off the temperature sensor from the inner space between the cover 18 and the surface of the housing panel 50.

Figure 6A:
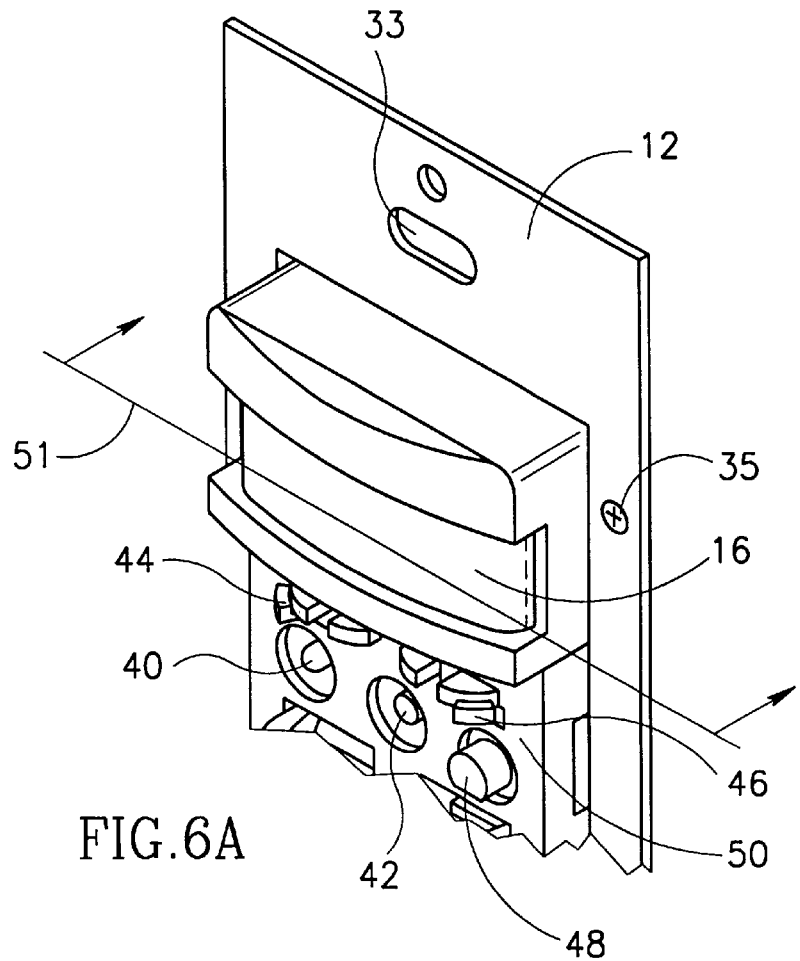
FIG. 6A is a perspective view illustrating the mid section portion of the sensor unit in more detail wherein the PIR sensor blinds are in the open position.
Figure 6B:
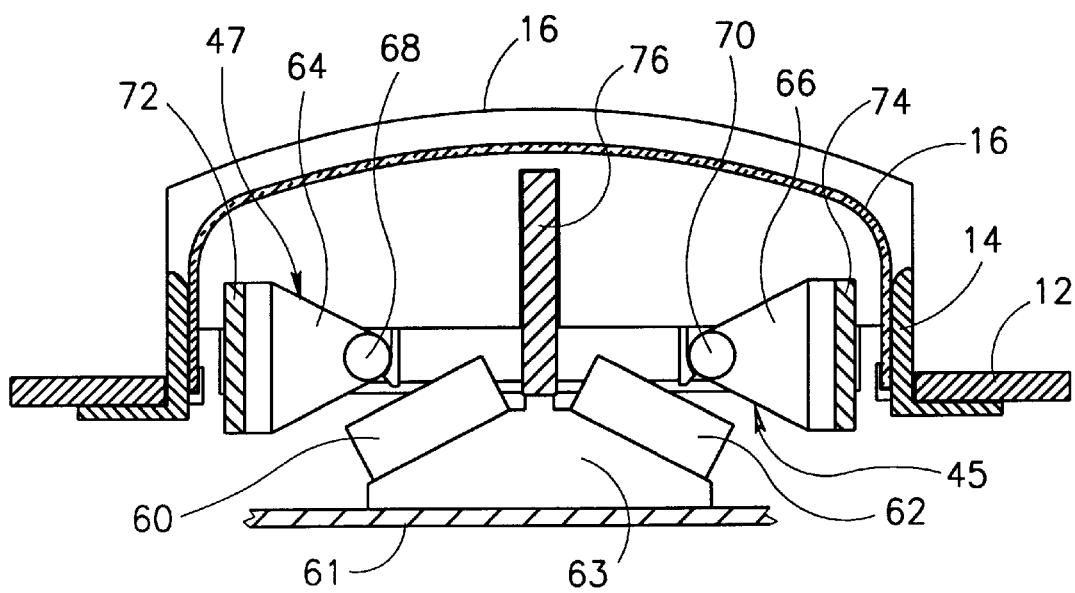
FIG. 6B is a cross sectional view illustrating the mid section portion of the sensor unit in more detail wherein the PIR sensor blinds are in the open position.

A perspective view illustrating the mid section portion of the sensor unit in more detail wherein the PIR detector blinds are in the open position is shown in FIG. 6A. The adjusting levers 44, 46 are shown in their widest open position, i.e., the adjusting levers are positioned closest to the housing panel 50. In this position, the PIR detectors are exposed to the largest area through the lens 16. An illustration of the cross sectional cut 51 is shown in FIG. 6B. The dual PIR detectors 60, 62 are fastened to a mounting block 63, which in turn is fixed to the printed circuit board 61. The lens 16 is fixed to the housing 14. The housing 14 is fastened to the mounting plate 12.

A partition or separating wall 76 functions to separate the radiation falling on the two detectors 60, 62, reducing interference effects as well as providing mechanical support in the event a foreign object is pressed against the lens. Two blinders 45, 47 functions to adjust the amount of radiation falling on the detectors 60, 62. Blinder 45 comprises an elongated shutter section 74 supported by a lower wall 66 and an upper wall (not shown) and a cylindrical stud or pivot 70. Similarly, blinder 47 comprises an elongated shutter section 72 supported by a lower wall 64 and an upper wall (not shown) and a cylindrical stud 68. The shutters are pivotally mounted to permit the blinders to be opened and closed. The blinders pivot on an axis perpendicular to the cylindrical studs 68, 70.

The blinders may be curved and are preferably constructed of a material that does not pass the signal the detectors are adapted to respond to. The shutter sections may comprise a natural or synthetic rubber, thermoset or thermoplastic material or any other suitable molded or machinable material. The material used is preferably moldable plastic.

Figure 7A:
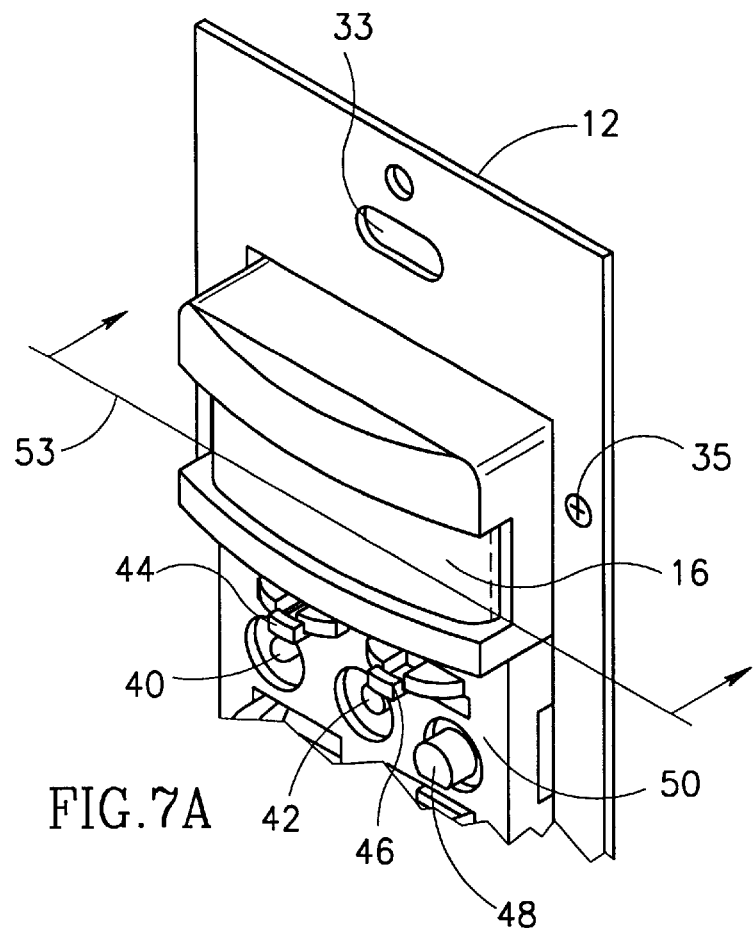
FIG. 7A is a perspective view illustrating the mid section portion of the sensor unit in more detail wherein the PIR sensor blinds are in the closed position.
Figure 7B:
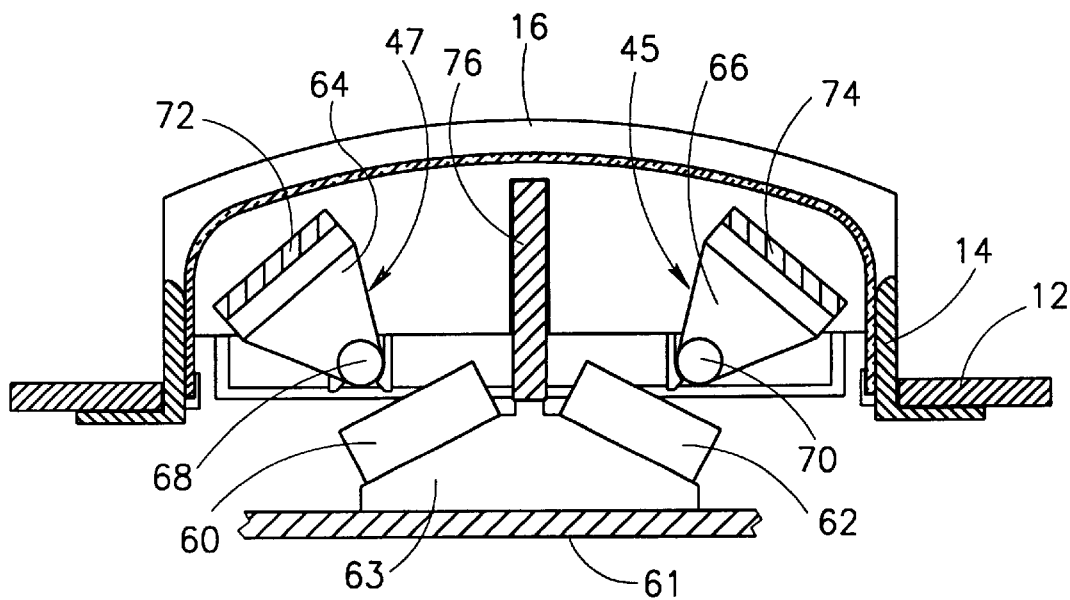
FIG. 7B is a cross sectional view illustrating the mid section portion of the sensor unit in more detail wherein the PIR sensor blinds are in the closed position.

A perspective view illustrating the mid section portion of the sensor unit in more detail wherein the PIR sensor blinds are in the closed position is shown in FIG. 7A. The adjusting levers 44, 46 are shown in their narrowest closed position, i.e., the adjusting levers are positioned furthest away from the housing panel 50. In this position, the PIR detectors are exposed to the smallest area through the lens 16. An illustration the cross sectional cut 53 is shown in FIG. 7B. The blinders 45, 47 are shown in their most closed position. In this position, the largest amount of radiation coming through the lens 16 is blocked from falling on the detectors 60, 62.

Note that each of the blinders 45, 47 is independently adjustable so that the angles that each blinder is set to may be equal or unequal. To narrow the field of view of the detectors, the blinders 45, 47 are rotated towards the partition 76. Vice versa, to broaden the field of view of the detectors, the blinders 45, 47 are rotated away from the partition 76. A more detailed description of the operation and construction of the blinders and the housing may be found in U.S. Pat. No. 5,739,753, entitled Detector System With Adjustable Field Of View, similarly assigned and incorporated herein by reference.

Figure 8:
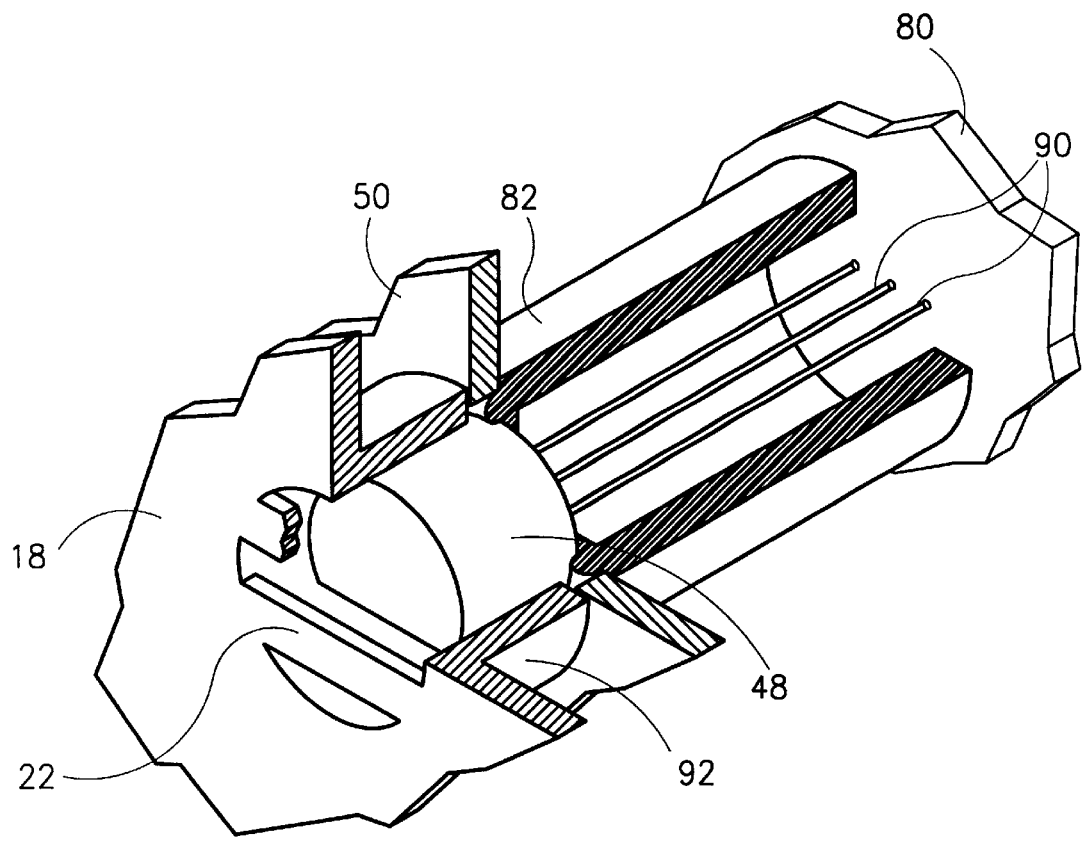
FIG. 8 is a perspective view illustrating the temperature sensor and associated pedestal, housing and cover in more detail.

The mounting of the temperature sensor within the housing will now be described in more detail. A perspective view illustrating the temperature sensor and associated pedestal, housing and cover in more detail is shown in FIG. 8. For clarity sake, a cutaway drawing is shown wherein the remaining portion of the device has been omitted. The plurality of electrical leads 90 from the temperature sensor 48 are mounted on the PC board 80 via soldering or other means. The temperature sensor is mounted on a cylindrically shaped pedestal 82 that extends from the surface of the PC board 80 to the base of the temperature sensor 48. The electrical leads 90 of the temperature sensor 48 are inserted into corresponding openings on the upper surface of the pedestal 82. The circular cutout in the housing panel 50 is larger than the diameter of the temperature sensor 48 and adapted to mate with the surface of the cylindrical portion 92 of the cover 18. The inner diameter of the cylindrical portion 92 is made large enough so as to permit air to enter via the vent 22 and diffuse and circulate around the sensor.

In accordance with the present invention, the cover 18, housing panel 50 and pedestal 82 are constructed and positioned so as to seal off the temperature sensor from the rest of the device. Thus, an air chamber is formed in which the sensor is positioned which permits air from outside the device to diffuse through the vent 22 to the temperature sensor 48. Thus, the sensor is not exposed to any internal air channels that may be present and is separated from the PIR detectors so that they do not interfere with one another.

Figure 9A:
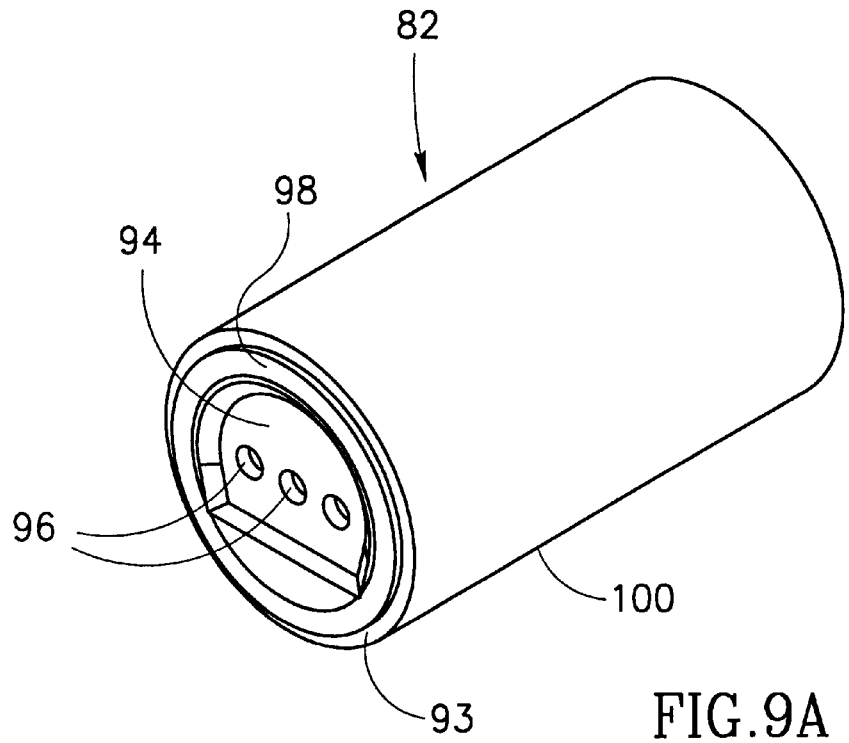
FIG. 9A is a perspective view illustrating the temperature sensor pedestal in more detail.
Figure 9B:
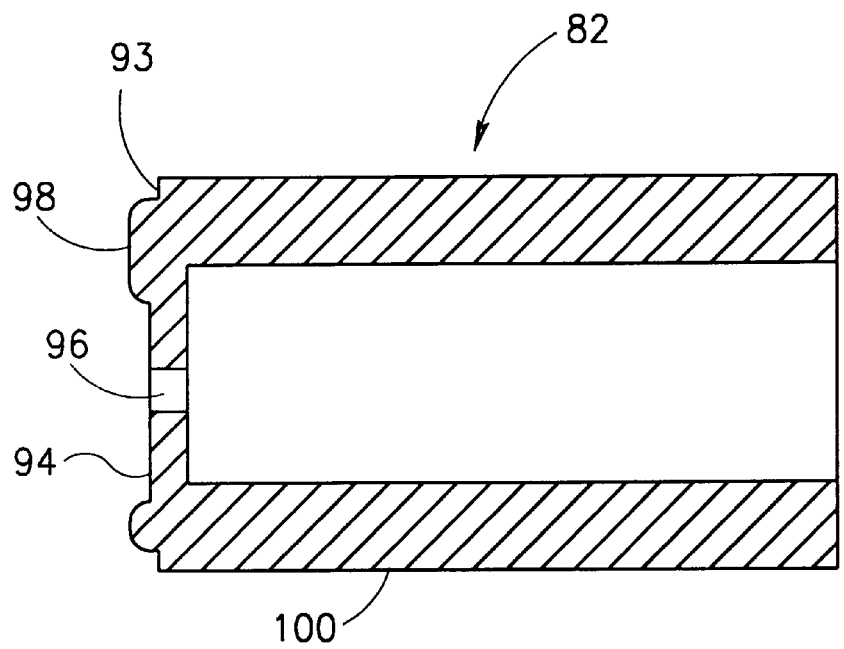
FIG. 9B is a side cross section view of the temperature sensor pedestal.

The pedestal 82 will now be described in more detail. A perspective view illustrating the temperature sensor pedestal 82 in more detail is shown in FIG. 9A. A side cross section view of the temperature sensor pedestal 82 is shown in FIG. 9B. As described above, the pedestal 82 functions to support the temperature sensor 48 at a height above the PC board and also functions to environmentally isolate the temperature sensor 48 from the interior of the device.

The pedestal 82 comprises a cylindrical body 100 and has a hollow interior. One end of the body 100 is closed off thus forming an upper portion. The upper portion comprises a substantially flat surface 94 with a plurality of apertures 96 therewithin. The flat surface 94 is recessed and adapted to mate with the bottom surface of the temperature sensor and is shaped in accordance therewith. Surrounding the flat portion is a circular raised ridge 98 extending around the entire diameter of the pedestal. A circular lip 93 is formed between the ridge 98 and the outer wall of the body 100.

The pedestal is positioned such that the lip 93 sits flush against the interior edge of the housing panel 50 (see FIG. 8). The ridge 98 is adapted to fit snug within the inner diameter of the cutout in the housing panel. Thus, the pedestal 82 functions to seal the temperature sensor 48 from air circulating within the device between the PC board 80 and the housing panel 50. It is important to note that other shapes for the pedestal 82 are also possible other than the one shown here. Regardless of the type or shape of the sensor, the upper surface portion of the pedestal should be adapted to mate with the sensor to enclose it thus substantially forming a seal around the bottom portion of the sensor as shown herein.

Figure 10:
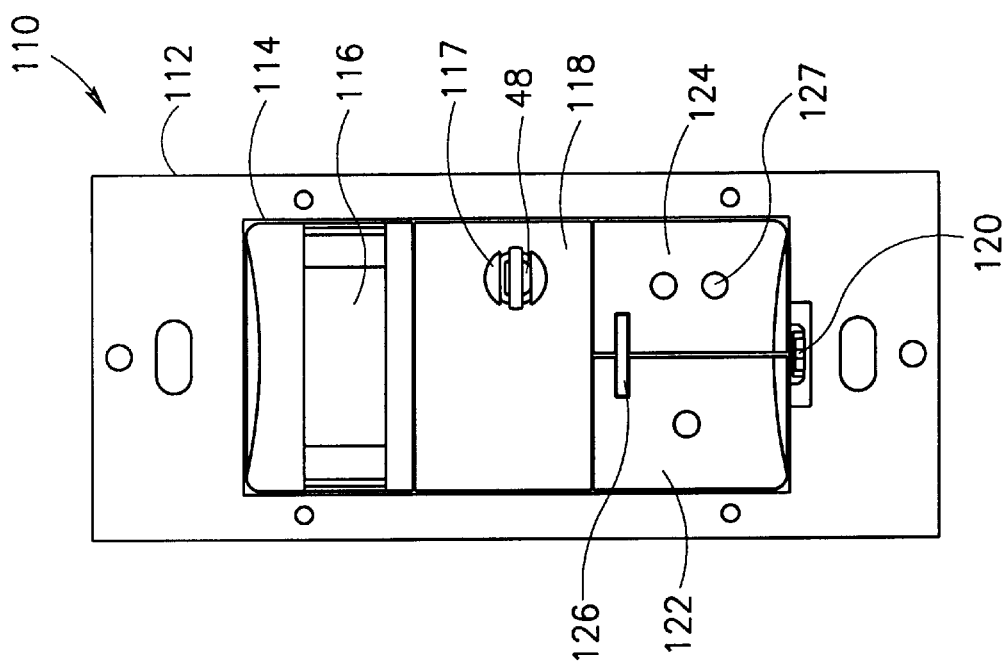
FIG. 10 is a front view illustration of a second embodiment of the sensor unit of the present invention incorporating two switches and having the mid section cover in place.

A second embodiment of the multi-sensor device will now be presented. The first embodiment discussed above, incorporated multiple sensors with a single switch. The second embodiment presented herein incorporates two switches. A front view illustration of a second embodiment of the sensor unit of the present invention incorporating two switches and having the mid section cover in place is shown in FIG. 10. The device, generally referenced 110, in similar to device 10 of FIG. 1 with the difference being that two switches are included rather than one. This embodiment is useful when it is desired to control two separate logical loads from a single device in on/off fashion.

The device comprises a mounting plate 112, housing 114, lens 116 for the PIR detectors, a cover 118 that may or may not be removable and which includes a vent 117 permitting air to diffuse through to the temperature sensor 48. A first switch cover 122 and a second switch cover 124 are provided having optional raised bumps 127 to help users distinguish the two switches from each other, such as when operating the switch in low light or darkness. Also shown are the mode switch 120 which can be placed in an on, auto or off positions and the light pipe 126 which permits an internal LED or other light source to be visible to a user.

Figure 11:
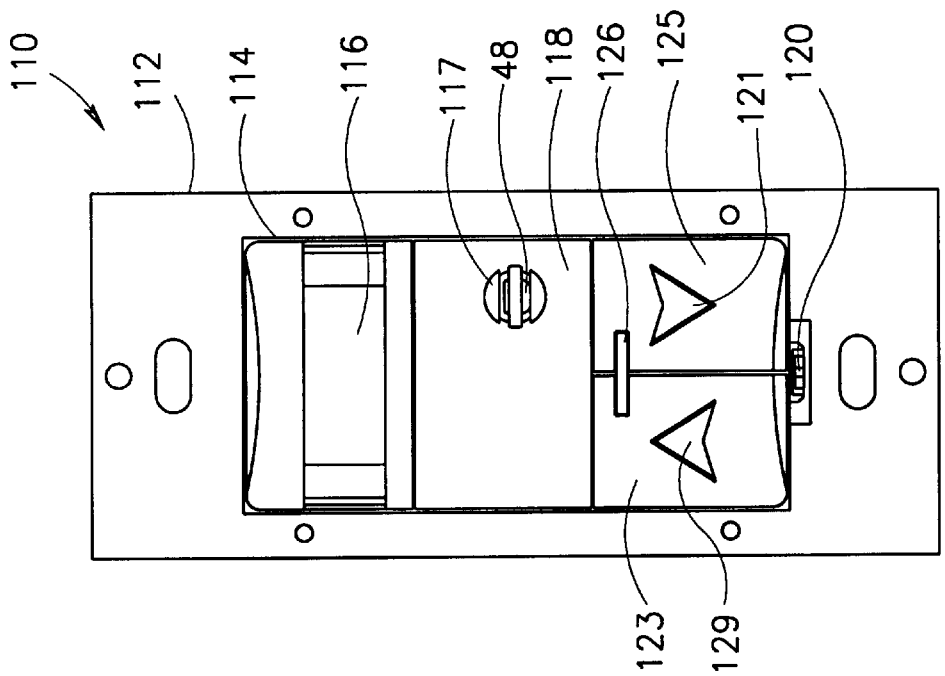
FIG. 11 is a front view illustration of a third embodiment of the sensor unit of the present invention incorporating two switches and having the mid section cover in place.

A third embodiment also splits the switch cover 28 (FIG. 1) into two separate covers as the device of FIG. 10. A front view illustration of a third embodiment of the sensor unit of the present invention incorporating two switches and having the mid section cover in place is shown in FIG. 11. The device of FIG. 11, however, provides a dimmer function for a single or multiple electrical loads. The switch cover 123, when pressed, functions to brighten the load as indicated by the up arrow 129 and conversely, when the switch cover 125 is pressed, the load is dimmed, as indicated by the down arrow 121.

Similar to the device of FIG. 10, the device comprises a mounting plate 112, housing 114, lens 116 for the PIR detectors, a cover 118 that may or may not be removable and which includes a vent 117 permitting air to diffuse through to the temperature sensor 48. A mode switch 120 can be placed in an on, auto or off position and a light pipe 126 permits an internal LED or other light source to be visible to a user.

Figure 12:
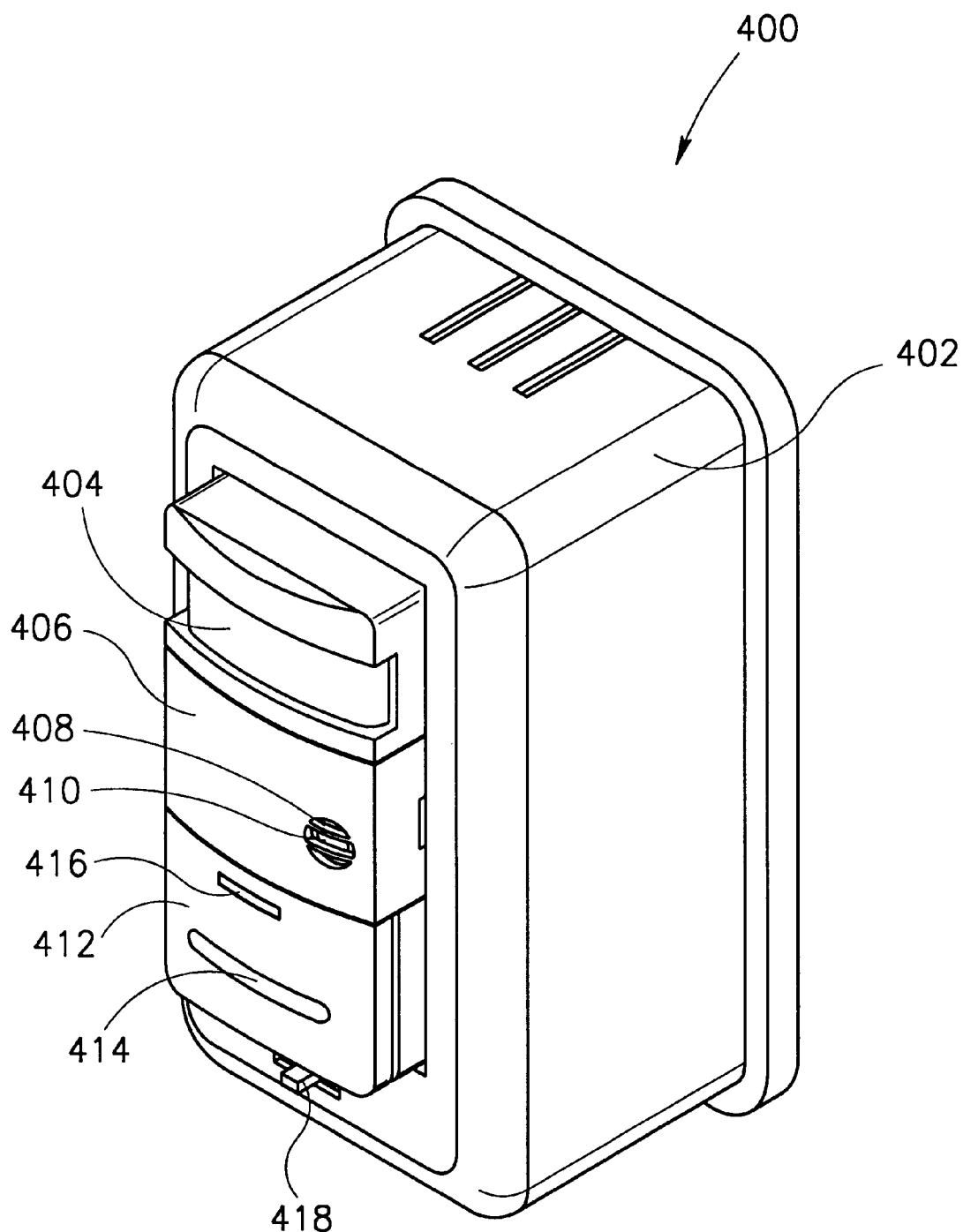
FIG. 12 is a perspective view illustration of a fourth embodiment of the sensor unit of the present invention, a surface mount sensor unit incorporating a single switch and having the mid section cover in place.

A fourth embodiment comprises a sensor unit similar to that of FIGS. 1 and 2 but suitable for mounting on a surface of a wall. A perspective view illustration of a fourth embodiment of the sensor unit of the present invention incorporating a single switch and having the mid section cover in place is shown in FIG. 12. The device, generally referenced 400, comprises a surface mount housing 402. The sensor unit also comprises an aperture covered by a lens or window 404. The aperture is used to house an occupancy sensor, e.g., passive infrared sensor (PIR). Note that the occupancy sensor may comprise one or more PIR detectors, e.g., dual PIR detectors.

A cover 406, which may or may not be removable, is positioned below the motion detection element lens 404. The cover 406 also incorporates an aperture or vent 408 allowing air to diffuse through to an inner chamber housing the temperature sensor 410.

A switch cover or plate 412 having a raised bar portion 414 is located below the cover 406. The switch is used to control a logical electrical load that the device is bound to. The logical load may comprise one or more physical electrical loads. When pressed, a message is sent to the control device connected to the load to be switched. The message is interpreted and the control device carries out any required action.

An aperture 416 is located within the switch cover 412 and may optionally include a transparent or translucent window or light pipe therewithin. The aperture 416 provides visual access to a visual indicator such as an LED. The visual indicator is used to provide feedback to the user, e.g., in connection with the status of the bound electrical load or the status of occupancy as determined by the PIR sensor.

The device 400 also comprises a switch 418 that provides the user a means for placing the device into one or more modes. Typically, the switch 418 comprises three positions: ON, AUTO and OFF: The ON position turns the electrical load on regardless of other inputs, the AUTO position lets the load be controlled by one or more sensor inputs and the OFF position turns the load off regardless of the state of the sensor inputs.

Figure 13:
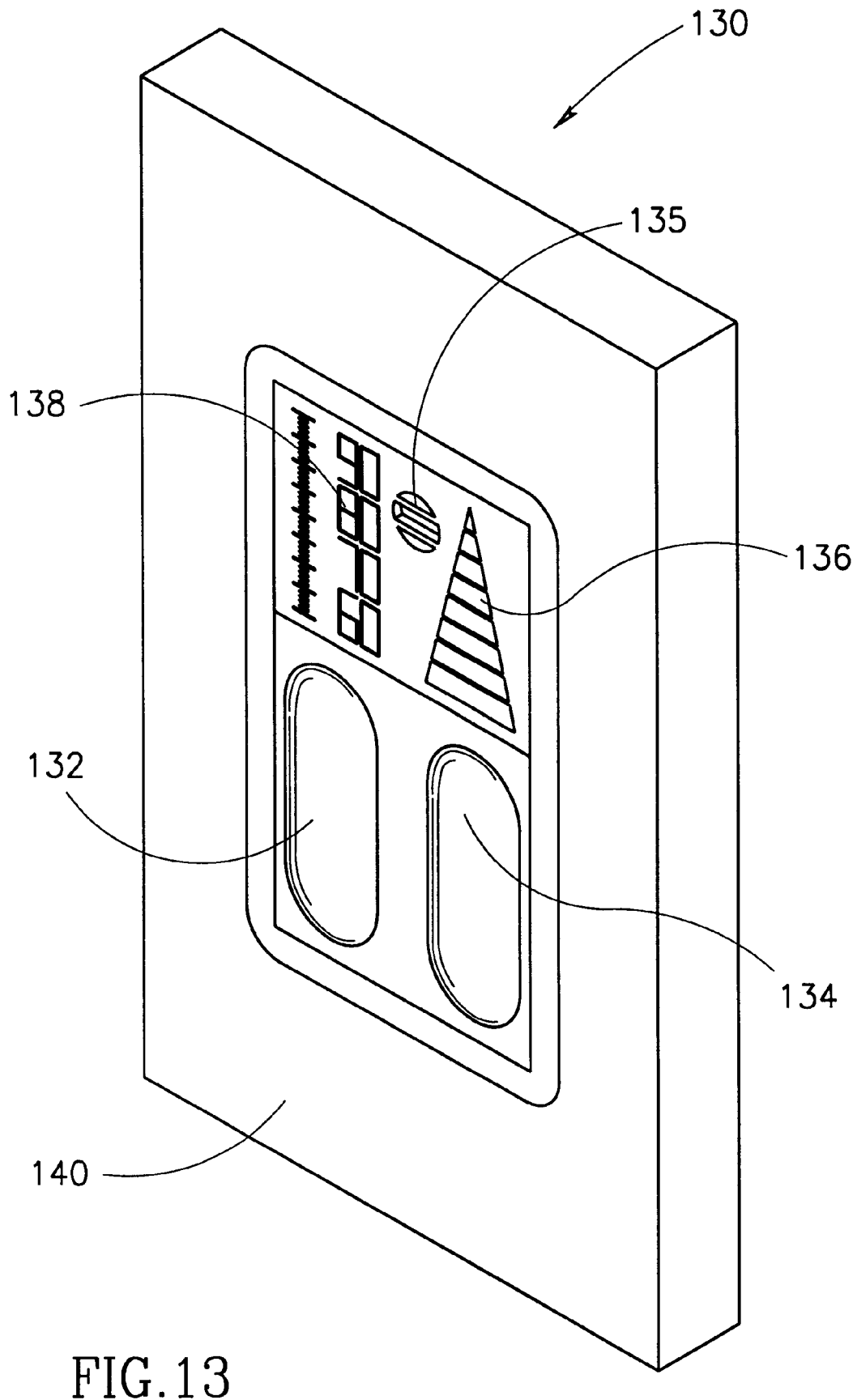
FIG. 13 is a diagram illustrating an example multi-sensor unit incorporating a display, dimming brighten/dim control and temperate/room brightness display.

A diagram illustrating an example multi-sensor unit incorporating a display, dimming brighten/dim control and a temperate/room brightness display is shown in FIG. 13. This is one alternative for a display that may be incorporated into the multi-sensor device. The device, generally referenced 130, is shown installed with a cover plate in a single gang wallbox. The elements visible comprise a cover plate 140 that surrounds the device, an up/down dimming control 132, 134, a temperature display 138, a brightness display 136 and vents (or louvers) 135 for a temperature sensor located just below them. The vent 135 are similar in construction and function as vents 22 shown in FIGS. 1 and 2.

The temperature display 138 is shown in degrees Fahrenheit but can be also displayed in degrees Celsius. The dimming control 132, 134 can provide not only a brighten/dim function but also an on/off function as well. Note that the device 130 may function only as a control and display device or alternatively, may incorporate the temperature sensor, ambient light sensor and occupancy sensor of the first, second, third and fourth embodiments described hereinabove.

The present invention is intended to function within a local operating network or network based control system incorporating multiple devices having different functionality. As an example, the local operating network can be applied to lighting and HVAC systems. The local operating network comprises one or more devices, a user interface, actuator element, power supply, communications media, media connections and protocol and sensor inputs. These components function to work together with other devices that can communicate using the same standard communication protocol to form a local operating network. The system comprises various device functionality including but not limited to various sensor and transducer functions such as motion detector sensors, temperature sensors, humidity sensors and dimming sensors. The devices may be packaged in various form factors including but not limited to surface mount, flush mount, wall mount and single or dual gang wall box and ceiling mount. Other features include light harvesting or constant light maintenance, time of day scheduling, on/off/auto switching and sensing, single and multiple 20 A 100 to 305 VAC switching devices for incandescent and fluorescent lighting loads and 8 A 800 W 100 to 305 VAC dimming triac devices with a series air gap relay element. The devices comprise software and/or firmware for controlling the operation and features of the device, 15 VDC power supply for supplying electrical power, a reset push button for resetting the device and a communications network media interface.

To aid in understanding the principles of the present invention, the invention is described in the context of the LonWorks communication protocol developed by Echelon Corp. and which is now standard EIA 709.1 Control Network Protocol Specification, incorporated herein by reference. Other related specifications include EIA 709.2 Control Network Powerline Channel Specification and EIA 709.3 Free Topology Twisted Pair Channel Specification, both of which are incorporated wherein by reference.

The scope of the present invention, however, is not limited to the use of the LonWorks protocol. Other communication network protocols such as CEBus, etc. can be used to implement a control network within the scope of the present invention.

A key feature of the system is that the devices on the network can interoperate over the network. In addition, the system can be expanded at any time, and the functionality of the individual components can be changed at any time by downloading new firmware.

For a device to be interoperable it must communicate in accordance with the protocol specification in use in the system, e.g., LonWorks, CEBus, etc. If a device complies with the standard or protocol in use, it can communicate with other devices in the system. The temperature sensor within the device may be bound (as defined by the LonWorks protocol) to the HVAC system, for example. After a threshold temperature is exceeded, the temperature sensor can respond by sending a command to the HVAC system to turn on the air conditioning.

Figure 14:
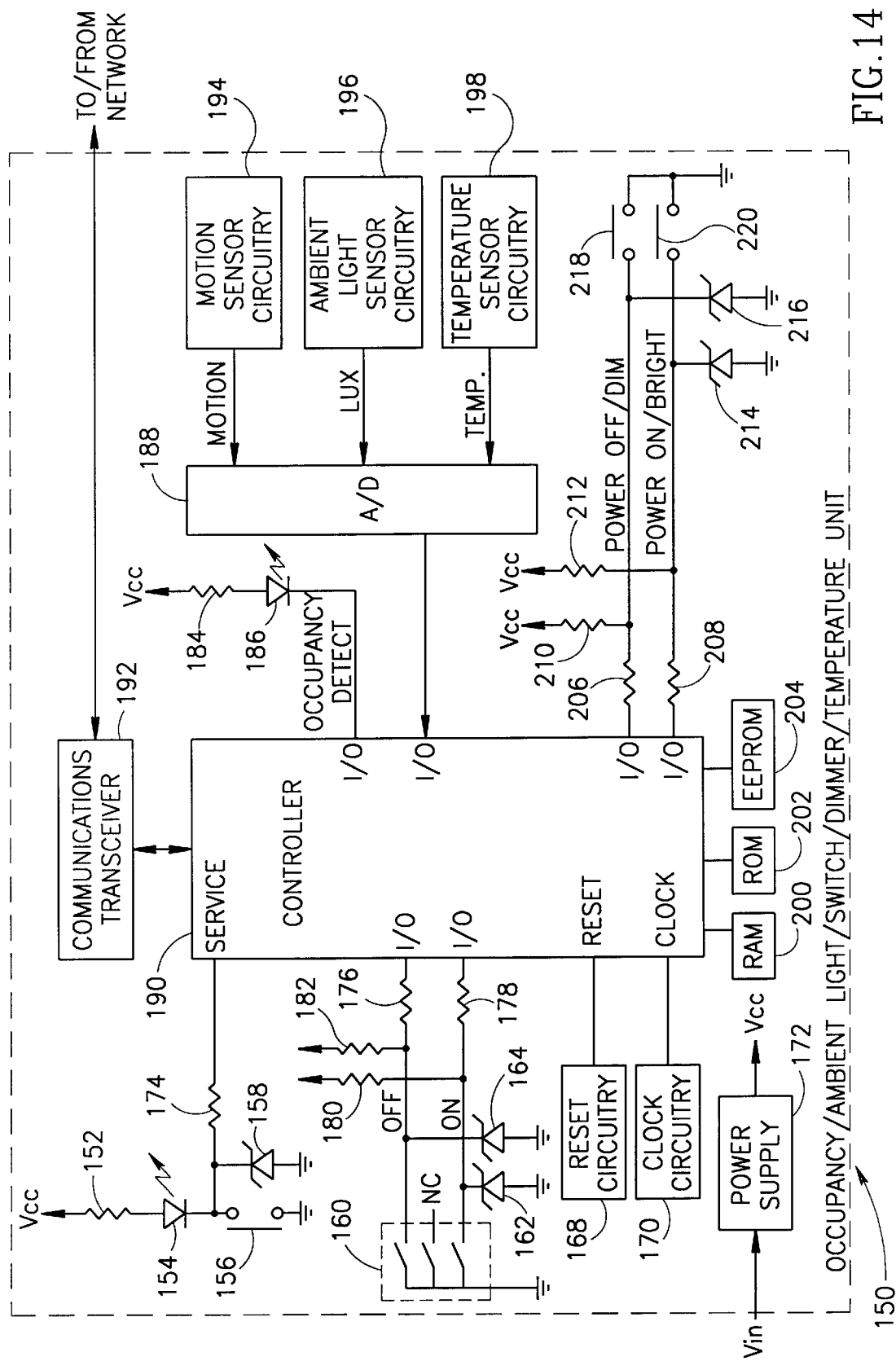
FIG. 14 is a schematic diagram illustrating the occupancy, ambient light, switch, dimmer and temperature unit of the present invention.

A schematic diagram illustrating the occupancy, ambient light, switch, dimmer and temperature unit (also referred to generally as the 'unit') of the present invention is shown in FIG. 14. The unit 150 comprises a controller 190 to which are connected various components. The controller 190 comprises a suitable processor such as a microprocessor or microcomputer. In the context of a LonWorks compatible network, the controller may comprise a Neuron 3120 or 3150 microcontroller manufactured by Motorola, Schaumberg, Ill. More detailed information on the Neuron chips can be found in the Motorola Databook: "LonWorks Technology Device Data," Rev. 3, 1997, incorporated herein by reference. Memory connected to the controller includes RAM 200, ROM 202 for firmware program storage and EEPROM 204 for storing downloadable software and various constants and parameters used by the unit.

A power supply 172 functions to supply the various voltages needed by the internal circuitry of the device, e.g., 5 V (Vcc), 15 V, etc. The power supply 172 may be adapted to provide $V_{cc}$ and other voltages required by the internal circuitry either directly from phase and neutral of the AC electrical power source or from an intermediate voltage generated by another power supply. For example, a 15 V supply voltage may be generated by another device and provided to the unit 150 via low voltage cabling. This reduces the complexity of the unit 150 thus reducing its cost by eliminating the requirement of having a high voltage power supply onboard.

A clock circuit 170 provides the clock signals required by the controller 190 and the remaining circuitry. The clock circuit may comprise one or more crystal oscillators for providing a stable reference clock signal. The reset/power supply monitor circuitry 168 provides a power up reset signal to the controller 190. The circuit also functions to monitor the output of the power supply. If the output voltage drops too low, the reset circuit 168 functions to generate a reset signal as operating at too low a voltage may yield unpredictable operation.

In the case of LonWorks compatible networks, the unit 150 comprises a service pin on the controller 190 to which is connected a momentary push button switch 156 and service indicator 154 which may comprise an LED. The switch 156 is connected between ground and the cathode of the LED 154. The anode of the LED is connected to Vcc via resister 152. A zener diode 158 clamps the voltage on the service pin to a predetermined level. The switch 156 is connected to the service pin via a series resistor 174. The service pin on the controller functions as both an input and an output. The controller 190 is adapted to detect the closure of the switch 156 and to perform service handling in response thereto. A more detailed description of the service pin and its associated internal processing can be found in the Motorola Databook referenced above.

The unit 150 is adapted to interoperate with other devices on the network. It incorporates communication means that comprises a communication transceiver 192 that interfaces the controller 190 to the network. The communications transceiver 192 may comprise any suitable communication/ network interface means. The choice of network, e.g., LonWorks, CEBus, etc. in addition to the choice of media, determines the requirements for the communications transceiver 192. Using the LonWorks network as an example, the communications transceiver may comprise the FTT-10A twisted pair transceiver manufactured by Echelon Corp, Palo Alto, Calif. This transceiver comprises the necessary components to interface the controller to a twisted pair network. Transmit data from the controller 190 is input to the transceiver which functions to encode and process the data for placement onto the twisted pair cable. In addition, data received from the twisted pair wiring is processed and decoded and output to the controller 190. In addition to a free topology transceiver for a twisted pair network, other transceivers can be used such as RS- 232, RS-485 or any other known physical layer interfaces suitable for use with the invention. In addition, transceivers for other types of media such as power line carrier and coaxial, for example, can also be used.

The unit 150 also comprises mode switch means that provides three modes of operation to the user: on/off/auto. The mode switch means comprises slide switch 160, pull up resisters 180, 182, series resisters 176, 178 and zener diodes 162, 164. The slide switch 160 is a three position slide switch which has two of the its terminals connected to two I/O pins on the controller 150 via series resistors 176, 178. One comprises the ON mode state and the other the OFF mode state. Software in the controller 150 periodically scans the two I/O pins for the state of the mode switch. The controller uses software adapted to decode the signal output of the mode switch to yield the actual switch position. The AUTO mode state is represented by both OFF and ON inputs being low.

The mode switch controls the operation of the unit 150. If the switch is in the OFF state, the on/off or brighten/dim features of the device are disabled. If the switch is in the AUTO position, the device operates normally. When the mode switch is on the ON position, the load is forced to turn on regardless of the state of the on/off/auto switch inputs.

As described hereinabove, the unit 150 is adapted to measure temperature, ambient light and to detect occupancy. The unit 150 comprises motion sensor circuitry 194 that functions to generate a MOTION signal representing the level of motion; ambient light sensor circuitry 196 that functions to generate a LUX signal representing the level of light; and temperature sensor circuitry 198 that functions to generate a TEMP signal representing the temperature level. The three analog signals MOTION, LUX and TEMP are input to a three channel A/D converter 188. Mux control of the A/D converter 188 is provided by the controller 190. The digitized output of the A/D converter is input to an I/O port on the controller 190. Alternatively, the A/D conversion function may be incorporated into the controller as is common with many commercially available microcontrollers.

An occupancy detect indicator 186, which may comprise an LED, provides a user visual feedback as to the detection of motion by the unit. The cathode of the LED 186 is input to an I/O pin on the controller 190 and the anode is pulled high by pull up resistor 184. An active low on the signal OCCUPANCY_DETECT causes the LED to light.

The unit also provides a user the capability to either turn one or more lighting devices on/off and or to brighten/dim them. The unit 150 comprises circuitry two momentary contact switches 218, 220 that are connected to two I/O pins on the controller 190 via series resistors 206, 208, respectively. One end of each switch is coupled to ground and the other end is clamped by a zener diode 214, 216. The output of each switch is pulled high to $V_{cc}$ via pull up resistors 210, 212.

The two switches 218, 220 may be installed in the unit behind a rocker panel such that one switch is operated when one end of the toggle is pressed and the other switch is operated when the other end of the toggle is pressed. Pressing on the upper portion of the toggle turns the lighting load on and pressing on the lower potion turns it off. Alternatively, the unit can be adapted to cause the lighting load to brighten and dim in response to the toggle being pressed upwards or downwards, respectively.

In connection with the embodiment shown in FIG. 1, the device 10 only requires a single switch as this embodiment operates a single logical lighting load which could physically be many lighting loads. The switch plate 28 is adapted to operate only a single push button switch. Each switch closure toggles the state of the logical and physical lighting load.

In connection with the embodiment of FIG. 10, the device 110 requires two switches but each could operate a separate logical lighting load that could physically be many lighting loads. One switch plate 122 is associated with one load and the other switch plate 124 is associated with the other load. Each switch closure for each of the two switches functions to toggle the state of the respective logical and physical lighting load.

In connection with the embodiment of FIG. 11, the device 110 requires two switches for providing brighten/dim control for a single or multiple lighting load. One switch plate 123 is associated with the brighten function and the other switch plate 125 is associated with the dim function. In addition, the up switch plate 123 (seen in FIG. 11) may also turn the load on and the down switch plate 125 may function to turn the load off.

Thus, depending on the functionality desired in the device, the switches and associated hardware circuitry and software application may be adapted to provide numerous lighting control possibilities.

Figure 15:
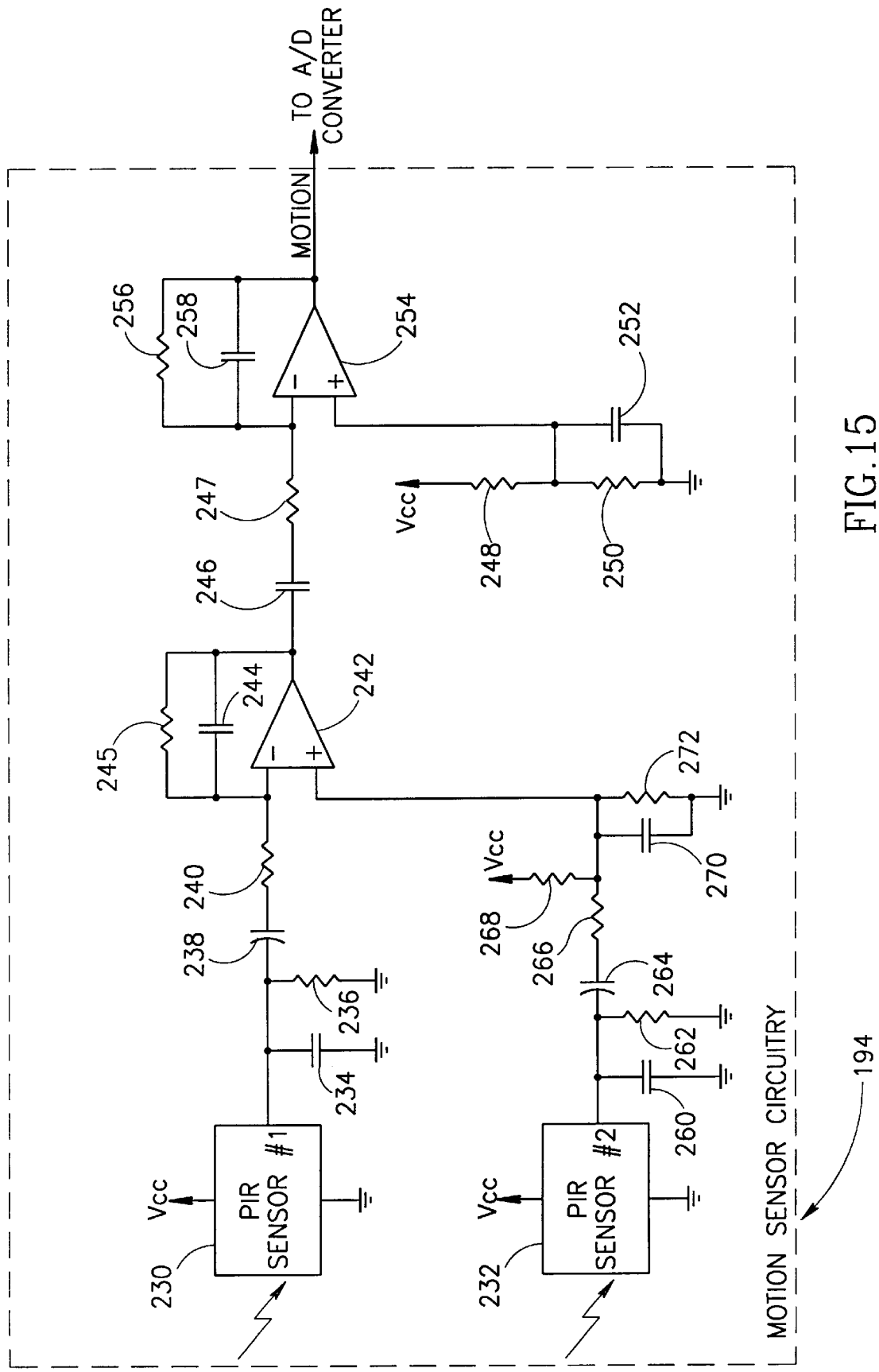
FIG. 15 is a schematic diagram illustrating the motion sensor circuitry portion of the multi-sensor unit in more detail.

The motion sensor circuitry will now be described in more detail. A schematic diagram illustrating the motion sensor circuitry 194 portion of the multi-sensor unit 150 in more detail is shown in FIG. 15. The motion sensor circuitry 194 comprises one or more passive infrared (PIR) sensors coupled between ground and $V_{cc}$. In the example disclosed herein, two PIR sensors 230, 232 are connected between ground and $V_{cc}$. The PIR sensors may comprise a single sensor unit such as part number LHI878 manufactured by EG&G Heimann Optoelectronics GmbH, Wiesbaden, Germany, or in the alternative a dual sensor unit. The signal output of PIR sensor #1 230 is processed by circuitry comprising capacitor 234 and resistor 236. The signal is then input to a signal conditioning operation amplifier (op amp) circuit comprising op amp 242, capacitors 238, 244 and resistors 240, 245. The signal is input to the inverting or negative input of the op amp 242.

The signal output of PIR sensor #2 232 is processed by circuitry comprising capacitor 260 and resister 262. The signal is then input to the non-inverting or positive input of the op amp 242 via capacitors 264, 270 and resistors 266 and 268, 272 that form a voltage divider.

The output of the op amp 242 is input to a second signal conditioning op amp circuit comprising op amp 254, capacitors 246, 258, 252 and resistors 247, 256, 248 and 250. The output of the op amp 254, i.e., the MOTION signal, is input to the A/D converter 188 (FIG. 14). The digital representation of the level of motion is processed by the occupancy task (described in more detail below) to determine whether or not the occupancy state should be declared.

Figure 16:
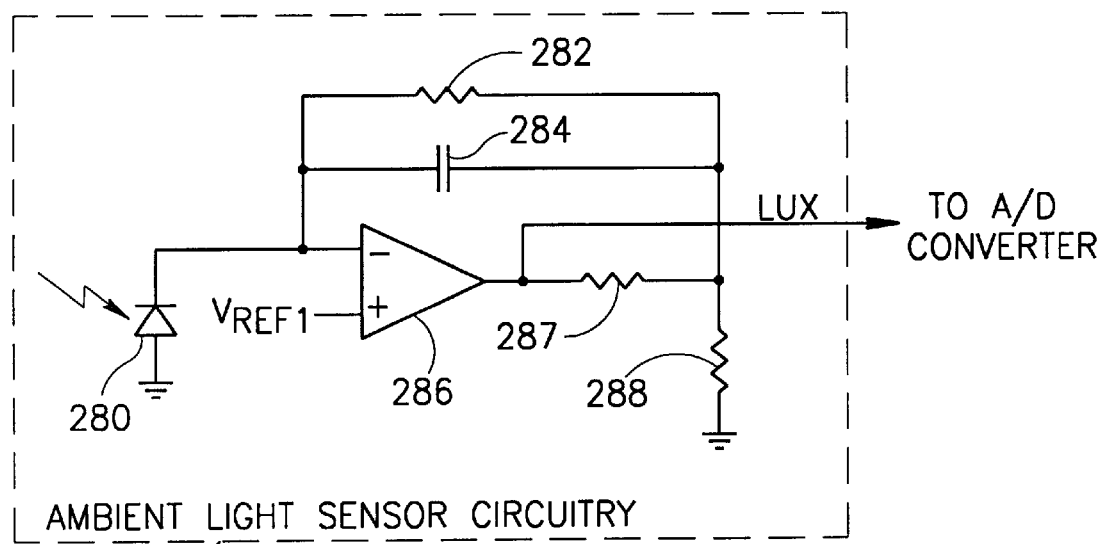
FIG. 16 is a schematic diagram illustrating the ambient light sensor circuitry portion of the multi-sensor unit in more detail.

A schematic diagram illustrating the ambient light sensor circuitry portion of the multi-sensor unit in more detail is shown in FIG. 16. The ambient light sensor circuitry 196 comprises an ambient light detector 280 such as part number S1087 manufactured by Hamamatsu Photonics K.K., Hamamatsu City, Japan. The cathode of the light detector 280 is connected to the inverting or negative input of op amp 286. The anode of the detector 280 is connected to ground. A voltage reference $V_{REF1}$ is input to the non-inverting or positive input of the op amp 286. Capacitor 284 and resistor 282 are placed in the feedback path from the output to the inverting input via a voltage divider connected to the output and consisting of resistors 287, 288. The output of the op amp 286, i.e., the LUX signal, is input to one of the channels of the A/D converter 188. The digitized ambient light level is processed by the ambient light level task (described in more detail below) and transmitted as a network variable to all devices over the network that are bound to the device.

Figure 17:
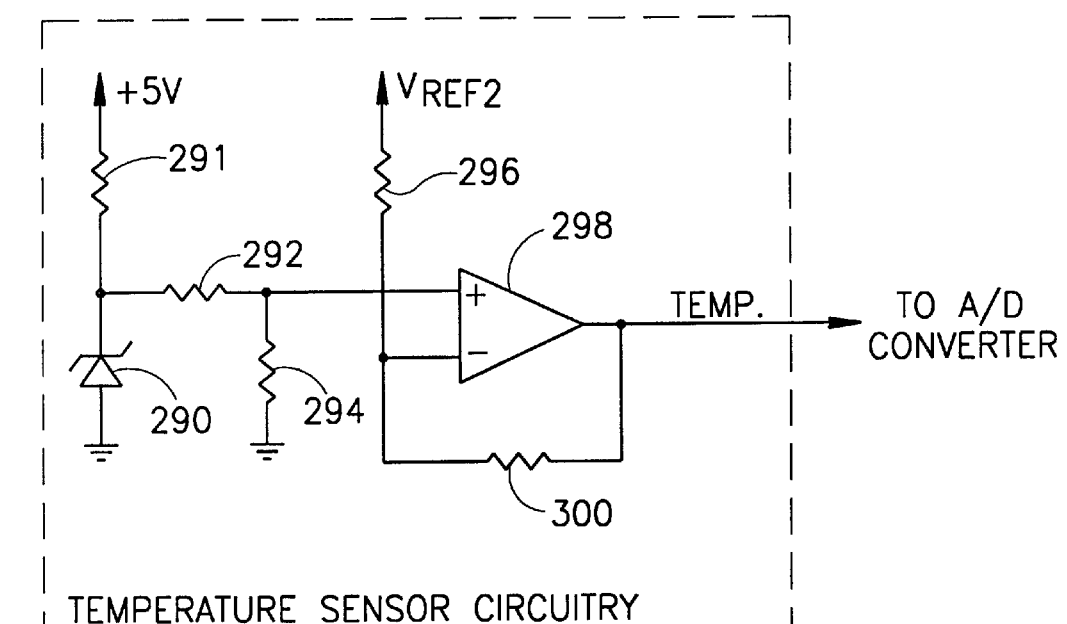
FIG. 17 is a schematic diagram illustrating the temperature sensor circuitry portion of the multi-sensor unit in more detail.

A schematic diagram illustrating the temperature sensor circuitry portion of the multi-sensor unit in more detail is shown in FIG. 17. The temperature sensor circuitry 198 comprises a temperature sensor 290 such as the LM335A manufactured by National Semiconductor. The anode of the temperature sensor 290 is coupled to ground while the cathode is part of a voltage divider whereby an cathode voltage of 2.94 V (typically) represents a sensor case temperature of 25 degrees C. The voltage divider is formed between a 5 VDC power supply voltage connected to resistor 291. The cathode of the temperature sensor 290 is input to the non-inverting or positive input of op amp 298 via series resistor 292 and resistor 294 coupled to ground. The inverting or negative input of op amp 298 is connected to a voltage reference $V_{REF2}$ (typically 2.5 VDC) via resistor 296 and is connected to the output via feedback resistor 300.

Resistors 296 and 300 are selected so as to provide a typical gain of 5, although other values of gain are also suitable. The gain of the op amp 298 can be modified to increase the resolution of the temperature reading over a given range. The output of the op amp 298, i.e., the TEMP signal, is input to one of the channels of the A/D converter 188. The digitized ambient light level is processed by the temperature task (described in more detail below) and transmitted as a network variable to all devices over the network that are bound to the device.

Figure 18:
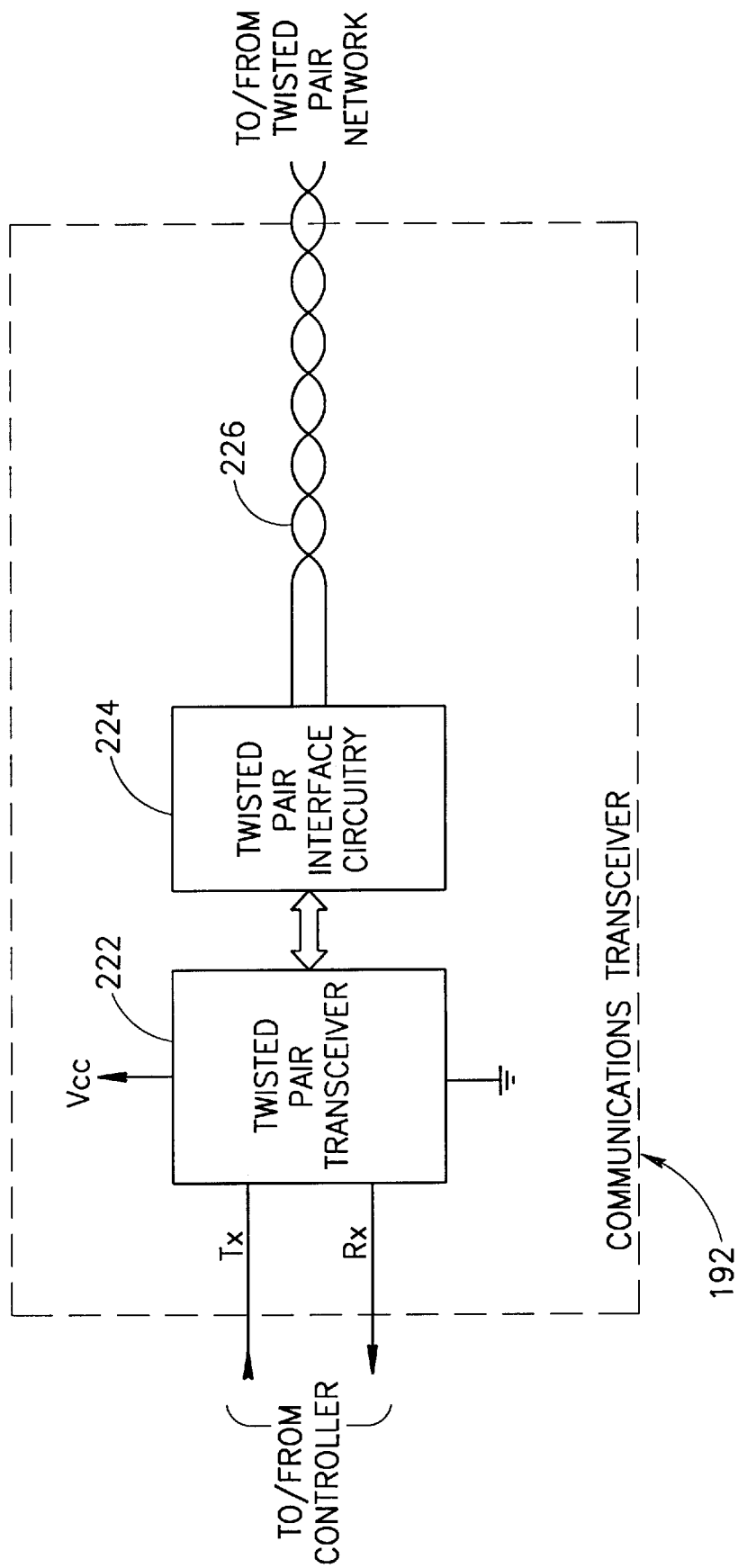
FIG. 18 is a block diagram illustrating the communications transceiver portion of the control unit in more detail.

A block diagram illustrating the communications transceiver 192 portion of the control unit in more detail is shown in FIG. 18. As described previously, the communications transceiver 192 functions to enable the control unit to communicate with other devices over the network. It is desirable that each device in the network incorporate communications means enabling it to share information with other devices. This is not, however, an absolute necessity as devices that do not employ a communications protocol or employ a protocol that is proprietary can also be part of the network. For example, a direct connection to the lighting load via a 0–10 VDC control line as well as a single analog output signal may be employed to communicate to one or more lighting and HVAC loads. In this example, the communications transceiver 192 is adapted to transmit and receive data over twisted pair wiring. As mentioned previously, the communication transceiver 192 could be adapted to other type of media as well including, but not limited to, power line carrier, coaxial, RF, etc.

The communications transceiver 192 comprises a twisted pair transceiver 222 for receiving Tx data from the controller 190 and for outputting Rx data to the controller 190. In the transmit path, the twisted pair transceiver 222 processes the Tx data received from the controller 190 resulting in a signal suitable for placement onto the twisted pair network. The Tx output of the twisted pair transceiver 222, which has been converted to a differential 2-wire signal, is input to the twisted pair interface circuitry 224 which functions to adapt the differential transmit signal to the 2-wire twisted pair network 226.

In the receive path, the signal received over the 2-wire twisted pair network 226 is input to the twisted pair interface circuitry 224. The interface circuitry functions to output a 2-wire differential receive signal that is input to the twisted pair transceiver 222. The twisted pair transceiver 222 processes the differential receive signal and generates an output Rx signal suitable for input to the controller 190.

A more detailed description of the communications transceiver suitable for twisted pair networks and for other types of network media can be found in the Motorola Databook referenced above.

Figure 19:
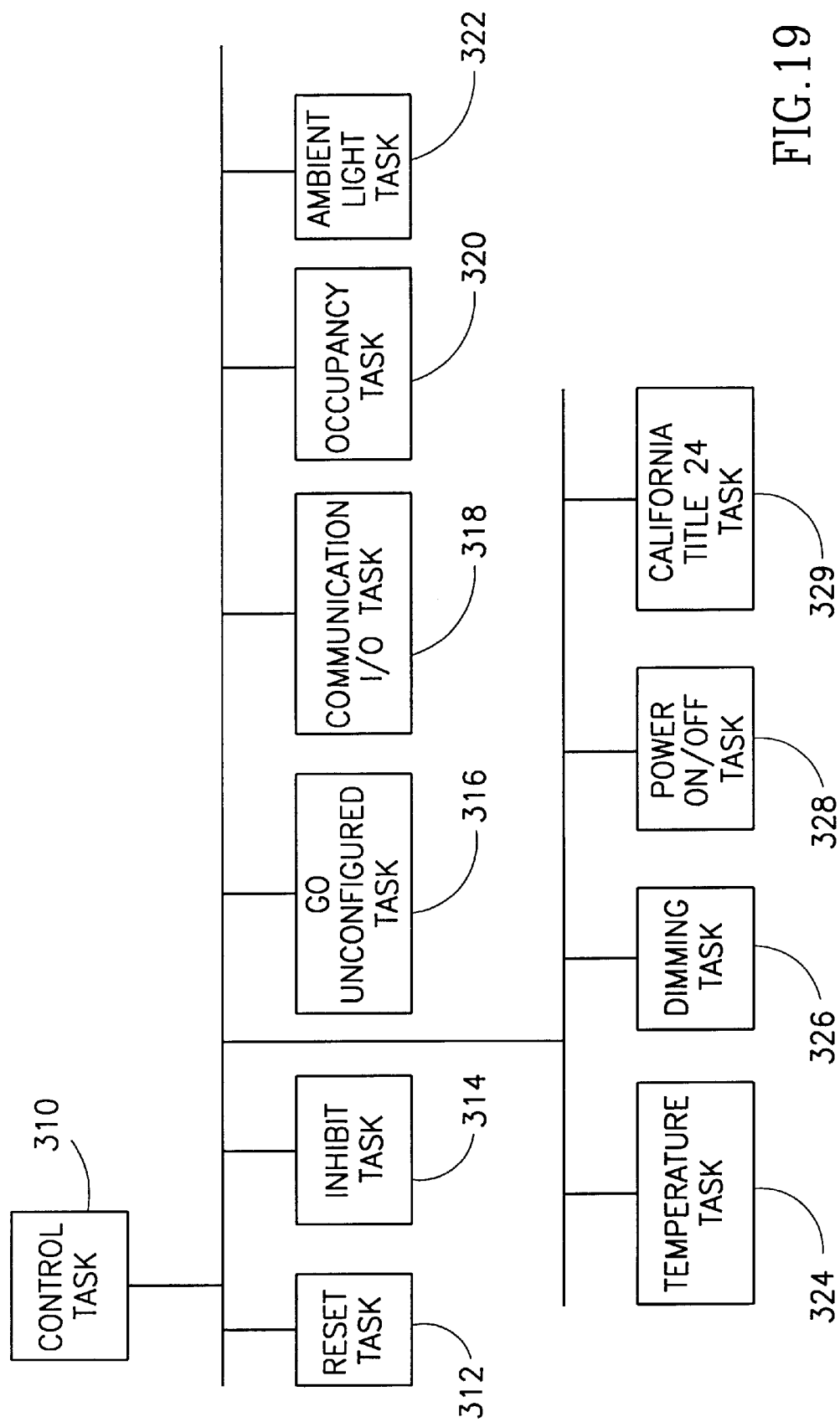
FIG. 19 is a block diagram illustrating the software portion of the multi-sensor unit in more detail.

A block diagram illustrating the software portion of the multi-sensor unit in more detail is shown in FIG. 19. The hardware and software components of the unit in combination implement the functionality of the device. The software portion of the unit will now be described in more detail. Note that the implementation of the software may be different depending on the type of controller used to construct the unit. The functional tasks presented herein, however, can be implemented regardless of the actual implementation of the controller and/or software methodology used.

In the example presented herein, the controller is a Neuron 3120, 3150 or equivalent. Some of the functionality required to implement the control unit is incorporated into the device by the manufacturer. For example, the processing and associated firmware for implementing the physical, link and network layers of the communication stack are performed by means built into the Neuron processor. Thus, non-Neuron implementations of the control unit would require similar communication means to be able to share information with other devices over the network.

It is important to note that some of the tasks described herein may be event driven rather than operative in a sequential program fashion. The scope of the invention is not limited to any one particular implementation but is intended to encompass any realization of the functionality presented herein. In addition, some of the tasks are intended to function based on input received from other devices that also communicate over the network.

The various tasks described herein together implement the functionality of the unit. Each of the tasks will now be described in more detail. The main control task 310 coordinates the operation of the unit. The control task is responsible for the overall functioning of the unit including initialization, housekeeping tasks, polling tasks, sensor measurement, etc. In general, the unit is adapted to measure one or more physical quantities, transmit the measured quantities over the network, issue commands to a control unit located on the network and respond to commands received over the network from other sensors and control devices.

The control is effected by the use of network variables referred to as Standard Network Variable Types (SNVTs), in the case of LonWorks networks, for example. Thus, the data transmitted over the network is transmitted in the form of one or more network variables. In addition, based on the values of the various network variables received by the unit, the unit responds and behaves accordingly. The following describes the functionality provided by the unit.

Reset

The reset task 312 functions to place the controller into an initialization state. Variables are initialized, states of the various drivers are initialized, memory is cleared and the device begins executing its application code. The reset task executes at start up and at any other time it is called or the power is reset. The reset task functions to initialize the internal stack, service pin, internal state machines, external RAM, communication ports, timers and the scheduler. Before the application code begins executing, the oscillators are given a chance to stabilize.

Inhibit

The inhibit task 314 provides the capability of inhibiting and overriding the normal operating mode of the device and possibly one or more other devices connected to the network. This task is intended to operate within an electrical network that is made up of a plurality of devices wherein one or more of the devices is capable of commanding a control device to remove and reapply electrical power from a logical load connected to it. The devices or nodes communicate with the control device over the communications network.

For example, in a network utilizing a plurality of sensors and a control unit coupled to one or more logical loads, wherein each logical load comprises one or more physical electrical loads, one of the devices generates an inhibit signal that is communicated to the control unit. The control unit then propagates a feedback signal to the plurality of sensors. The sensor devices may comprise any type of sensor such as an occupancy sensor, switch or dimming sensor. Each sensor device is bound to its associated control unit. The one or more physical electrical loads are connected to the control unit. A feedback variable is bound from the control unit to each of the sensors.

When one of the sensors is turned off, i.e., its switch setting is placed in the OFF position, the inhibit task is operative to inhibit the normal operating mode of all the other input sensors and the control unit. Note that the term 'turning a device off' includes switching the device off, disabling the device, placing the device in standby mode or tripping the device. There can be multiple sensor devices simultaneously in the off, disabled, standby or tripped mode. The control unit and its load remain inhibited until all the sensor devices are no longer in the off, disabled, standby or tripped mode. Thus, electrical power to the load controlled by the control unit remains disconnected until all sensor devices are in the on position.

This feature is particularly suited to permit maintenance or service to be performed in a safe manner on (1) any of the sensors, i.e., switching, occupancy, dimming, etc. sensor devices, logically connected to the same control unit or on (2) the load physically connected to the control unit.

The mode switch 160 (FIG. 14) is used for placing the unit into an off, disabled, standby, tripped or maintenance inhibit mode. The switch means can be implemented using mechanical or electronic means or a combination of the two either at the device itself or remotely over a network via one or more control commands. Optionally, a pull out tab or mechanical arm can be used to put the input device into the maintenance off mode when it is pulled out. The pull out tab or mechanical arm would leave the input device in normal operating mode when pushed back in.

In either case, when the input device is placed in the off position, an inhibit message is sent to the control unit over the network. In response, electrical power to the attached load is removed. Subsequently, all other sensor devices that are bound to the same control unit are inhibited from causing power to be applied to the load. This permits safe access to the control unit and to the load for service or maintenance reasons. The normal operating mode of all the sensor devices connected to the same control unit is inhibited or overridden. Until all sensor devices that have previously been placed in the off mode are put into the on mode and returned to their normal operating condition, all sensor devices are not permitted to change the state of the load or the control unit.

Further details on the implementation of the inhibit task can be found in co-pending U.S. application Ser. No. 09/045, 625, filed Mar. 20, 1998 entitled APPARATUS FOR AND METHOD OF INHIBITING AND OVERRIDING AN ELECTRICAL CONTROL DEVICE, similarly assigned and incorporated herein by reference.

Go Unconfigured

The go unconfigured task 316 provides the capability of placing a device (also referred to as a node) in an unconfigured state. This is useful whenever the device needs to be placed in a certain state such as the unconfigured state. A major advantage of this feature is that it provides an installer of LonWorks based systems the ability to easily place the electrical device (the node) in an unconfigured state utilizing the same button 156 (FIG. 14) that is used in making a service request.

When the device is in the configured node state (also known as the normal operating mode state), the device is considered configured, the application is running and the configuration is considered valid. It is only in this state that both local and network derived messages destined for the application software layer are received. In the other states, i.e., the application-less and unconfigured states, these messages are discarded and the node status indicator 154 (FIG. 14) is off. The node status indicator is typically a service light emitting diode (LED) that is used to indicate to a user the status of the node.

A device is referred to as configured if it is either in the hard off-line mode (i.e., an application is loaded but not running) or in the configured node state as described above. A node is considered unconfigured if it is either application-less or in the unconfigured state, i.e., no valid configuration in either case. Via the go unconfigured task, a user can force the device into the unconfigured state so that it can be re-bound to the network, i.e., the device must be 'reset' within the LonWorks system.

More specifically, the term going unconfigured, is defined as having the execution application program loaded but without the configuration available. The configuration may either be (1) not loaded (2) being re-loaded or (3) deemed bad due to a configuration checksum error.

In a LonWorks device, an executable application program can place its own node into the unconfigured state by calling the Neuron C built in function 'go_unconfigured( )'. Using this built in function, an application program can determine, based on various parameters, whether or not an application should enter this state. When the device does enter the unconfigured state, the Node Status Indicator flashes at a rate of once per second.

The unit of the present invention utilizes the service pin on the controller, e.g., Neuron chip, to place the node in an unconfigured state. Under control of the firmware built into the Neuron chip, the service pin is used during the configuration, installation and maintenance of the node embodying the Neuron chip. The firmware flashes an LED suitably connected to the service pin at a rate of ½ Hz when the Neuron chip has not been configured with network address information. When the service pin is grounded, the Neuron chip transmits a network management message containing its 48 bit unique ID on the network. A network management device to install and configure the node can then utilize the information contained within the message. The Neuron chip checks the state of the service pin on a periodic basis by the network processor firmware within the chip. Normally, the service pin is active low.

Further details on the implementation of the go unconfigured task can be found in co-pending U.S. application Ser. No. 09/080,916, filed May 18, 1998 entitled APPARATUS FOR AND METHOD OF PLACING A NODE IN AN UNCONFIGURED STATE, similarly assigned and incorporated herein by reference.

Communication I/O

The communication I/O task 318 functions in conjunction with the communication means located in the controller and the communication transceiver connected to the controller. The controller itself comprises means for receiving and transmitting information over the network. As described previously, the communications firmware for enabling communications over the network is built into the Neuron chip. Further details can be found in the Motorola Databook referenced above.

Occupancy

The occupancy task 320 is used to detect occupancy and maintain the occupied state until no occupancy is detected. The occupancy task 320 implements the occupancy functionality of the unit. Typically, the output generated by the occupancy task 320 is bound to a control unit or similar device, which controls electrical power to the load. The occupancy task 320 performs the motion detection function and calculates application delay and/or hold times as required. The SNVT 'SNVT_occupancy' can be used in implementing the occupancy detection and reporting functions.

Along with the basic detection of motion, the occupancy task can utilize one or more configuration parameters that function to control the detection and reporting operations. In particular, a hold time parameter, e.g., SNVT_time_sec nciHoldTime, can be set which delays the reporting of a change from the occupied to unoccupied state. Note that preferably the occupancy sensor changes from the unoccupied state to the occupied state rapidly, but changes from the occupied to the unoccupied states after a delay. The purpose of the delay is to avoid unnecessary network traffic when the occupancy sensor is not detecting motion continuously. This is particularly useful when PIR detectors are employed in the sensor unit.

The occupancy task 320 functions to control a relay or dimming load in accordance with the detection of motion in an area. One or more occupancy sensor devices can be bound to a relay or dimming object within the controller. A network may include a plurality of occupancy sensors and a control unit coupled to a load. Typically, the occupancy sensors are bound via the network to the control unit. The load to be switched or dimmed is coupled to the control unit. In a LonWorks network, any number of sensors can be bound to the same object (load). The occupancy task 320 does utilize any feedback from the control unit. In addition, more than one load can be connected to and controlled by the control unit.

In addition, a light-harvesting feature (described in more detail below) can be enabled or disabled for each input. This feature utilizes the light level sensed by an ambient light level sensor also connected to the network. When occupancy is detected, the sensor functions to generate a command that is sent to the occupancy task in the control unit. The command is sent via the setting of a value for a particular network variable. The occupancy task first checks the current level of the light. If light harvesting is enabled, the lights turn on in accordance with the light-harvesting task. The ambient light level is periodically checked and the brightness of the lights is adjusted accordingly. If light harvesting is not enabled, then the lights are turned on in accordance with the following Lighting Priority Order:

1. If the last light level value was not equal to zero, i.e., completely off or 0%, then the level of the lights will be set to the last dim level that was set at the time the lights were last turned off.
2. If the last light level value was equal to zero but the Preferred Level is not equal to zero then the level of the lights will be set to the Preferred Level value. Note that it is not desirable to set the lights to a 0% dim level, as confusion may arise whether the device is operating properly, since 0% dim appears as completely off.
3. If the last light level value was equal to zero and the Preferred Level is null then the level of the lights is set to maximum brightness, i.e., 100%.

Note that in each case, the light level is brought up the required level in gradual increments, resulting in a gradual turn on of the lighting load. The Preferred Level value (also referred to as the Happy State) is a brightness level that is calculated in order to reduce the number of writes to the EEPROM connected to the controller. The Preferred Level is generated by using a sliding check of the brightness levels set by the user over time. The Preferred Level is set if the light is turned on to the same brightness level a predetermined number of times consecutively, e.g., 5 times. If the current level is equal to the previous level the required number of times consecutively, then that particular brightness level is stored in EEPROM and a variable is set within the controller. The counter is reset once a current level does not match the current level. Note that a Preferred Level of zero is stored or permitted.

As described above, the analog signal MOTION output by the occupancy sensor circuitry 194 (FIG. 15) is input to one of the channels of the A/D converter 188. The digitized value is then input to the controller who reads it periodically.

The MOTION signal is a bipolar analog signal adapted to the range of 0 to 5 V for input to the A/D converter. With a 12-bit A/D converter, the MOTION signal is converted into a value from 0 to 4096. The value 2300 is taken as the null motion level that represents no detected motion.

The controller functions to generate a window with high sense and a low sense values forming the boundaries of thresholds of the window. If the A/D value exceeds the high sense threshold or is lower than the low sense threshold, occupancy is declared. The high and low sense values are variable depending on the field of view/sensitivity setting set by the user. The values of the high and low sense thresholds for various field of view settings are presented below in Table 1.

TABLE 1

| Field Of View | Low Sense | High Sense | Delta Δ |
|---|---|---|---|
| High | 1900 | 2700 | ±350 |
| On | 1700 | 2900 | ±500 |
| Medium | 1300 | 3300 | ±1000 |
| Low | 700 | 3900 | ±2000 |
| Off | | Occupancy Off | |

Thus, based on the field of view setting, occupancy is declared when the A/D value exceeds either the low or high sense thresholds. The larger the field of view, the smaller the window size, i.e., smaller A/D values cause occupancy to be declared. Conversely, the smaller the field of view, the larger the window size, i.e., larger A/D values cause occupancy to be declared.

After either the low or high sense threshold is exceeded, the AID value is tracked and the occupancy detect LED 186 (FIG. 14) is illuminated. Once the value falls back below either threshold, a delay timer is started. The length of the timer is adjustable and is relatively short, e.g., 50 to 100 ms. If the A/D value remains within the threshold settings for the entire timer duration, the occupancy LED is extinguished and a hold timer is started. The occupancy state is not changed at this point and electrical power to the load is not removed. The hold timer counts a hold time duration that is settable over the network by a user. Only after the hold time is reached without the A/D value exceeding either threshold is the occupancy state removed and a network message is transmitted instructing the control unit to turn the load off.

For LonWorks based networks, the following output network variables may be used in implementing the occupancy sensor function: occupancy, occupancy numerical output and occupancy auxiliary state. The following input network variables may be used: hold time, maximum send time and field of view.

A key feature of the unit is that both the field of view and the sensitivity of the occupancy sensor can be adjusted over the network. Optionally, adjustments can be scheduled at either specific or random time intervals as determined by a scheduler who transmits commands to the unit. For example, the field of view can be automatically adjusted over the network in accordance with the time of day, time clock, scheduler or other devices or inputs such as a local set point button/slider or via a network management tool.

The field of view and the sensitivity of the occupancy sensor can be changed by varying the threshold window that is used to process the MOTION signal (FIG. 15) output of the occupancy sensor circuitry. The threshold information may reside in non-volatile memory, e.g., EEPROM, and can be altered over the network. It may also be stored in RAM and changed dynamically over the network. Different applications could employ the ability to adjust the field of view combined with the ability to set different levels, different polarities such as negative or positive response of the PIR, time frames or number of hits or cycles.

A user of the unit has the ability to select the desired field of view level between high, on, medium, low and off, representing fields of view >100%, 100%, 50%, 25% and off, respectively.

The occupancy sensor can be overridden, i.e., ignored, in response to a scheduled or random input. For example, occupancy may be ignored during certain times of the day such as during nighttime hours. A switch can be bound with the occupancy sensor to provide an override function to turn the lights on at night or during off-hours. This feature is useful since the PIR detectors activate when they detect changes in heat or high levels of energy which are often generated, for example, by walkie talkies. Thus, this feature functions to minimize the 'false ons' that occur when the HVAC system is turned off at night or on in the morning.

In addition, the unit may be adapted to require a sequence or combination of multiple sensor input activity from one or more devices in various locations before establishing that occupancy exists. This functions to reduce the effects of noise that may be present in the environment the unit is operative in.

Ambient Light Level

The ambient light task 322 functions to measure the ambient light level and output the corresponding lux value. The ambient light task 322 implements the ambient light functionality of the unit utilizing the LUX output of the ambient light sensor circuitry 196 (FIG. 16). The ambient light level task functions to maintain a particular lux level within an area, if the user enables this mode. The task receives ambient light sensor data from an ambient light sensor bound to it over the network. The ambient light sensor periodically sends lux reading updates to the ambient light level task. The lux level to be maintained is provided by the user.

The ambient light level task operates in conjunction with the occupancy sensor device and its related occupancy task. If an occupancy sensor detects motion, for example, the lights are controlled in accordance with the current ambient light level reading. If the light level is greater than or equal to the current maintenance lux level setting, then the lights are not turned on. If, on the other hand, the light level is greater than or equal to the current maintain lux level setting, then the light is turned on in accordance with the Lighting Priority Order described above.

The ambient light sensor has the ability to detect different light levels and is self calibrated via the intrinsic gain in each device. The sensors can be calibrated in the field by taking two ambient light readings and entering the values into a network management tool that would then adjust the processing algorithm to produce a more accurate reading.

One application of the ambient light feature is to maintain a particular lux level within an area. The ambient light task 322 receives light level data from the ambient light sensor and transmits the lux readings to all devices bound to it over the network.

The standard network variable SNVT_lux can be employed in the implementation of the ambient light task 322. In addition to the basic lux light level output, the light sensor object may input one or more parameters. In particular, the parameters may include the following:

1. location (nciLocation)—physical location of the light sensor.

2. reflection factor (nciReflection)—used to adjust the internal gain factor for the measured illumination level; this may be necessary because the amount of light reflected back to the sensor element from the surface might be different.
3. field calibration (nciFieldCalibr)—used by the light sensor to self calibrate the sensor circuitry; the ambient light value measured with an external lux meter is used as input to the light sensor which then adjusts its reflection factor to yield the same output value.
4. Minimum send time (nciMinSendT)—used to control the minimum period between network variable transmissions, i.e., the maximum transmission rate.
5. Maximum send time (nciMaxSendT)—used to control the maximum period of time that expires before the current lux level is transmitted; this provides a heartbeat output that can be used by bound objects to ensure that the light sensor is still functioning properly.
6. Send on delta (nciMinDelta)—used to determine the amount by which the value obtained by the ambient light sensor circuitry must change before the lux level is transmitted.

Note that these parameters are optional and may or may not be used in any particular implementation of the ambient light task.

The ambient light sensor circuitry operates with an offset. A light level of zero lux generates approximately 1.6 V at the output of the A/D converter 188. In addition, the sensor and its housing are adapted to be sensitive to changes in light intensity on tabletops within the area to be covered. The cover (lens) positioned over the sensor so that light enters via the aperture 26 (FIG. 1) in the switch cover. This arrangement, however, functions to attenuate the light even more. Thus, an offset and a correction factor must be applied to values read from the sensor.

A value from the sensor is read in to the controller 190 periodically, e.g., every 100 ms. An average is computed for every 10 values read in. This number is then used to calculate a lux reading using the following expression, $$lux\_value = conversion\_factor \cdot 1000 \cdot (average - offset) \cdot \left(\frac{\max(LUX)}{\max(average) \cdot 1000}\right)$$

The above equation yields a LUX value in the range of 0 to 2,500 lux. In addition, a user can supply a reflection coefficient that can be factored into the calculation of the lux value. The reflection coefficient is expressed as a number in the range of +/−3.0. The lux value calculated using the equation above is multiplied by the reflection coefficient to yield a lux value compensated for reflections.

Further, a linearity correction (slope offset correction adjustment or calibration factor) can be applied which typically varies from room to room. Two light readings are taken, one in bright light and the other in dim light. Two sets of readings are taken: one using the unit 150 and the other set using an external sensor. The system installer can perform this procedure at the time the system is initially installed.

Figure 20:
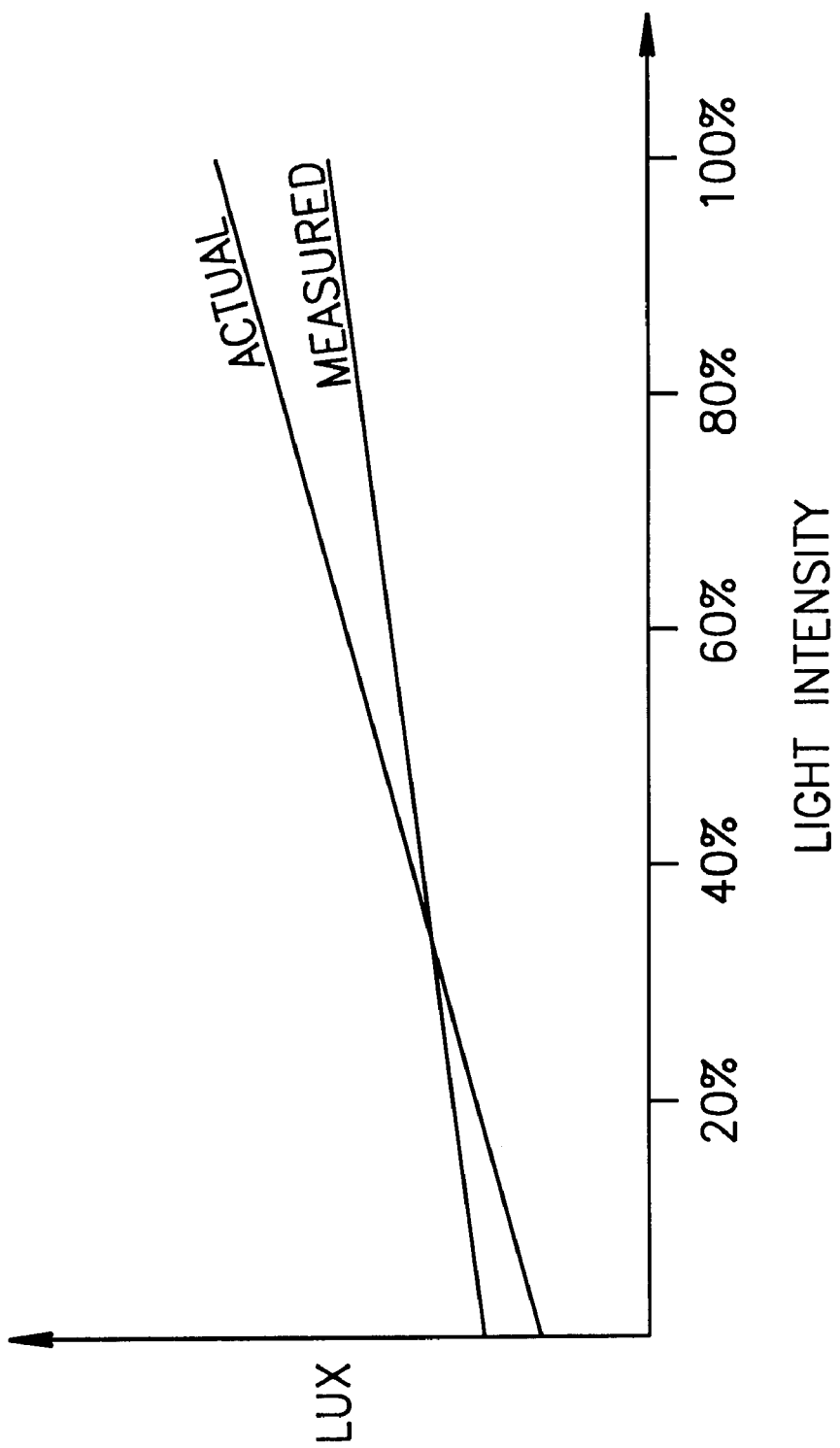
FIG. 20 is a diagram illustrating the relationship between the actual and measured lux versus light intensity.

A diagram illustrating the relationship between the actual and measured lux versus light intensity is shown in FIG. 20. The linearity correction procedure described above, compensates for this slope offset.

Temperature

The temperature task 324 functions to read the TEMP signals generated by the temperature sensor circuitry 198 (FIG. 17). The TEMP value is converted to digital by the A/D converter 188 and read into the controller 190. The temperature sensor circuitry is adapted to output a TEMP value corresponding to a temperature in the range of 0 to 50° C. Assuming an A/D with 0 to 5 V output range, a temperature of 25° C corresponds approximately to 2.5 V at the output of the A/D converter 188.

In accordance with the TEMP signal read in, a temperature value is calculated using the following, $$temperature\_value = 1000 \cdot TEMP \cdot \left(\frac{2500}{2100 \cdot 1000}\right)$$

The nonlinearity of the temperature sensor can be corrected for by applying a calibration correction using slope and offset adjustments in similar fashion as the occupancy task described above.

In addition, a standard network variable can be employed in the implementation of the temperature sensor task. In addition to the basic temperature output, the temperature sensor object may input one or more parameters. In particular, the parameters may include the following:
1. location (nciLocation)—physical location of the light sensor.
2. field calibration (nciFieldCalibr)—used by the temperature sensor to self calibrate the sensor circuitry; the temperature value measured with an external temperature sensor is used as input to the temperature sensor which then adjusts its algorithm to yield the same output value.
3. Minimum send time (nciMinSendT)—used to control the minimum period between network variable transmissions, i.e., the maximum transmission rate.
4. Maximum send time (nciMaxSendT)—used to control the maximum period of time that expires before the current temperature reading is transmitted; this provides a heartbeat output that can be used by bound objects to ensure that the temperature sensor is still functioning properly.
5. Send on delta (nciMinDelta)—used to determine the amount by which the value obtained by the temperature sensor circuitry must change before the temperature reading is transmitted.

Note that these parameters are optional and may or may not be used in any particular implementation of the temperature sensor task.

As described above, the temperature sensor and software include an offset calibration value that can be employed to calibrate the temperature sensor. Also, the speed at which the temperature value is sent over the network can be increased or decreased.

Figure 21:
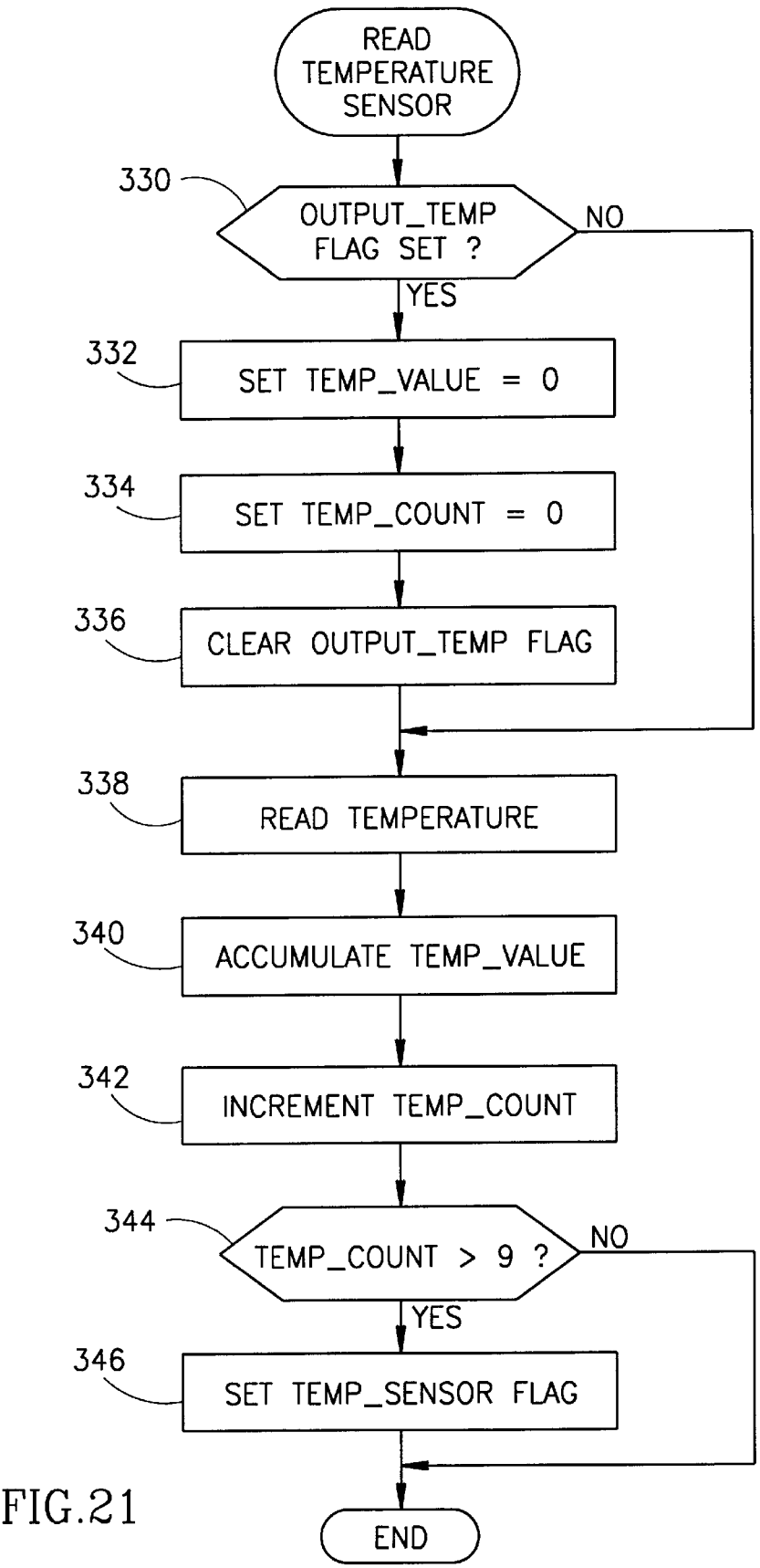
FIG. 21 is a flow diagram illustrating the read temperature sensor portion of the software in more detail.

A flow diagram illustrating the portion of the software used to read the temperature sensor in more detail is shown in FIG. 21. This process is performed on a periodic basis, e.g., every 100 ms. An average temperature reading is calculated every 10 cycles, i.e., once a second, in order to reduce the effect of transients and random fluctuations. First, it is checked whether the OUTPUT_TEMP flag is set (step 330). This flag is set true at the end of a cycle of 10 readings. If the flag is true, then the accumulated temperature variable TEMP_VALUE is reset to zero (step 332), the counter TEMP_COUNT is reset to zero (step 334) and the OUTPUT_TEMP flag is cleared (step 336).

If the flag is not set, these steps are skipped and control passes to step 338 wherein a temperature reading is input from the A/D converter 188 (step 338). The value read in is added to TEMP_VALUE (step 340). The counter TEMP_COUNT is incremented (step 342). When the count reaches 10 (step 344), the TEMP_SENSOR flag is set (step 346). If 10 temperature values have not yet been read in, the process ends. Note that depending on the controller used to implement the invention, the count may exceed 10 such as when the event scheduler internal to the controller could not service the event fast enough due to high loading.

Figure 22A:
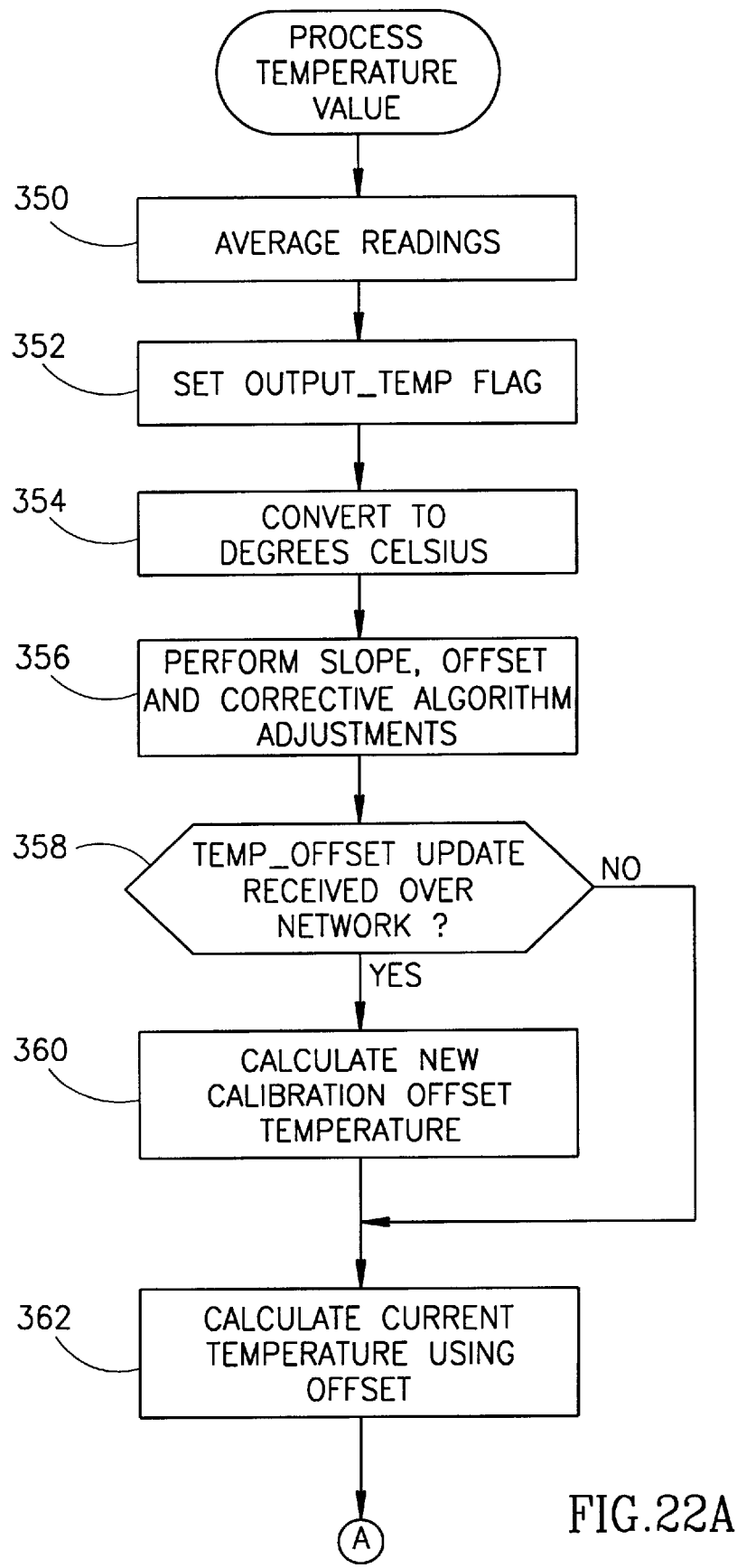
FIGS. 22A and 22B are a flow diagram illustrating the process temperature value portion of the software in more detail.
Figure 22B:
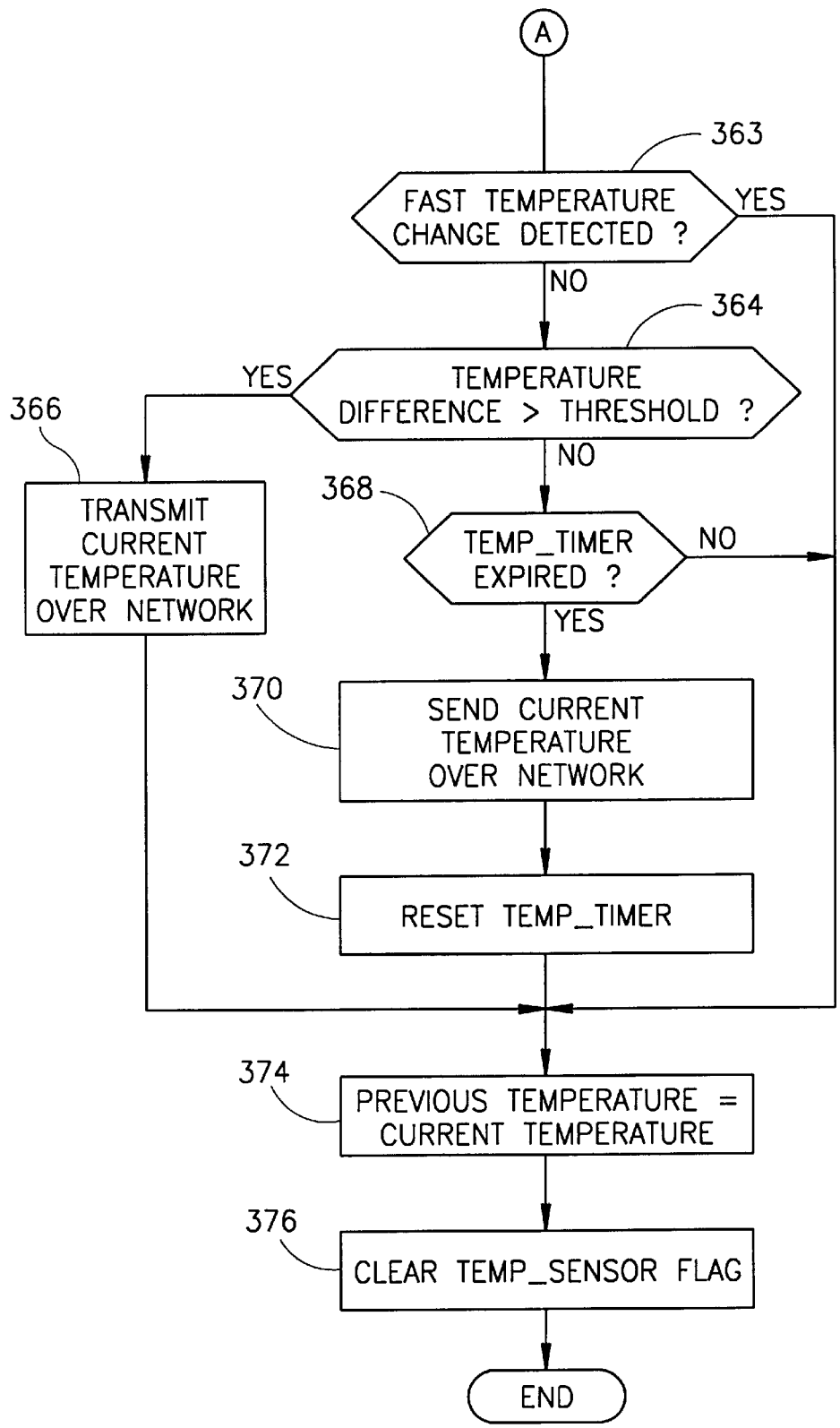

A flow diagram illustrating the process temperature value portion of the software in more detail is shown in FIGS. 22A and 22B. This routine is performed whenever the TEMP_SENSOR flag is set. First, the temperature readings are averaged by dividing TEMP_VALUE by TEMP_COUNT (step 350). The OUTPUT_TEMP flag is set so that a new set of readings can be accumulated (step 352). The digital number obtained for the average is converted to an equivalent number in degrees Celsius (step 354). After converting the average to degrees Celsius, one or more slope, offset and corrective algorithm adjustments are then performed (step 356).

It is then checked whether a TEMP_OFFSET update has been received over the network (step 358). If so, a new calibration offset temperature value is calculated (step 360). If no update has been received, the current temperature is calculated using the calibration offset (step 362).

If the current temperature is changing at a rate faster than a predetermined rate (step 363), then it is assumed that either a false influence is occurring or a fire may exist in the vicinity of the device. As described previously, since the temperature sensor may be exposed to the open air, a 'fast change algorithm' can be employed which functions to recognize a rapid rate of change of temperature at the sensor, e.g., more than 15 degrees per 10 seconds. The rapid temperature change may either be due to someone placing their finger on the sensor, applying a heat gun, applying a cold compress or may be due to flames from a fire. The software routine, in response the detection of a rapid rate of change in temperature, can either send a warning message over the network or ignore the change in temperature, regarding it as an artificial heat/cold source. The device can be programmed to respond either way, i.e., sending temperature data over the network and having it acted upon or internally filtering it out and ignoring it.

If a message is sent, the actual temperature value may or may not be sent depending on the configuration setup of the device. For example, if it is a false influence, the rapid change in temperature should be ignored and not displayed on the network or a local display, e.g., LCD display. To determine whether the current temperature is changing too fast, the previous temperature is compared to the current temperature. If the difference is too large per a specific time interval, then the method continues with step 374. If not, the method continues with step 364.

Next, the temperature reading just calculated is compared with the previous reading. If the difference is greater than a threshold (step 364) then the current temperature is transmitted over the network (step 366). If the difference is less than or equal to the threshold, the temperature is transmitted over the network (step 370) if the TEMP_TIMER timer expired (step 368). The timer is then reset (step 372).

The previous temperature is set equal to the current temperature (step 374) and the TEMP_SENSOR flag is cleared (step 376).

Dimming

The dimming task 326 implements the dimming functionality of the unit and functions to control a dimming load connected to a control unit or other dimming device directly or via the network. The unit 150 is connected to the network and bound to one or more control units. Brighten and dim commands are generated by the dimming task 326 and transmitted onto the network. In response, the dimming task 326 in the corresponding control units brightens or dims its associated dimming load accordingly.

A network may utilize a plurality of dimming sensors and a control unit coupled to a logical dimming load. The plurality of dimming sensors is bound to the control unit via the network. The logical dimming load, represented by one or more physical dimming electrical loads, is connected to the control unit. Note that the control unit may be adapted to control any number of logical or physical dimming loads. In addition, a feedback signal is bound from the control unit to each of the units 150. It is also the intent of the invention to allow for the dimming element and software to be incorporated within the sensor device 110 as well. That is, the control unit described above was described as a separate device for illustration purposes only, i.e., as an illustration of how the loads can be dimmed, and does not necessarily have to be constructed as a separate device.

On each of the units 150, the brightness level is adjusted by pressing a switch 28 (FIG. 1), 122, 124 (FIG. 10), 123, 125 (FIG. 11). Pressing on the switch increases the brightness level by an incremental amount, e.g., ½ or 1 full unit of resolution if the feedback equals zero. When the switch is pressed, a command is sent from the unit to the control unit that it is bound to. To dim the light, the switch is pressed again which causes a command to be sent to the control unit instructing it to dim the load bound to it.

Note that on single switch units, the single switch performs either on/off control or brighten/dim control. On two-switch units, on/off and brighten/dim control are provided for each load. Unit 110 (FIG. 11) alternatively uses two switches 123, 125 (an up and a down) to control single dimming load.

If the light was previously off, i.e., feedback equals zero, then quickly tapping the switch will turn the lights on in accordance with the Lighting Priority Order described above. Once on, a quick tap on the switch will turn the lights off. Once on, if the switch is pressed and held, the brightness level increases until the maximum brightness level is reached at which point no further action occurs. As the light level ramps up, the user ceases holding the switch and the light level reached at that point is used. Maximum brightness can be achieved faster by quickly tapping twice on the switch. Similarly, pressing and holding the switch causes the light level to dim until the user ceases holding the switch. Continuously holding the switch causes the light to dim to the completely off level.

If more than one unit 150 sensor is bound to the same dimming load in the control unit, then feedback is used to communicate information from the control unit to each of the units bound to it. Feedback is utilized to inform the other units that are also controlling the dimming load as to the state of the dimming load. Thus, all the units are synchronized and via feedback from the control unit are able to effectively track the actions of each other. The control unit preferably sends the feedback information after each command is received. For example, feedback may be sent to all the bound unit 200 ms after the last command related to the light level is received.

Power On/Off/Auto Task

The power on/off task 328 functions to control the on and off control of a relay in the control unit that is bound to the unit. The task functions similarly to the dimming task, with the difference being that the load is turned off and on rather than dimmed and brightened. Similar to the case of dimming, the on/off control of a load also may include binding a feedback variable to all the dimmer/switch units bound to a particular load connected to the control unit.

Each relay in the control unit has an associated relay driver circuit and a relay load. Using network variables within the context of a LonWorks based network, the task may respond, i.e., be bound, to various network variables and/or other input. For example, the task may be suitably programmed to respond to settings of the ON/AUTO/OFF mode switch 160 (FIG. 14) on the unit. If the mode is set to on, then the relay is turned on regardless of the setting of a bound occupancy sensor device or other sensor device. Thus, if a user turns the switch to the ON position, the task functions to transmit a command to the control unit to turn the relay on (provided that the control unit is not in the inhibited state). The relay would stay on, regardless of the state of other bound sensor devices such as occupancy sensor devices. The task also responds to the on/off commands from the switch 28 (FIG. 1); 122, 124 (FIG. 10), turning the relay on and off accordingly. When in the AUTO state, the relay load is controlled by switch closures on the unit 150 via variables bound to it over the network.

California Title 24

The California Title 24 task 329 functions to modify the operation of the power on/off and dimming tasks. This task prevents the relay or dimming load from turning on when there is sufficient light. Thus, the occupancy sensor or switch input sensor bound to the relay or dimming load attached to the control unit will not be able to turn the respective load on. In addition, if a sensor has already turned the load on, a switch input can only turn them off but not back on.

In connection with the dimming task 326 described above, if there is sufficient light in the room, the lights will not turn on or brighten to a 'turn on' or brighten command from a unit bound to the light.

In connection with the occupancy task 320, the lights will not turn on if there is sufficient light in the room. In the California Title 24 mode, the lights may only be turned on via the occupancy sensor circuitry detecting motion. A user may, however, dim the lights and turn them off via a switch. A user may brighten the lights but they will immediately dim in accordance with the light harvesting setting, if light harvesting is active. If light harvesting is not active, attempting to brighten and/or turn the lights on via a switch will have no effect.

While the invention has been described with respect to a limited number of embodiments, it will be appreciated that many variations, modifications and other applications of the invention may be made.

What is claimed is:

1. A multiple sensor device for use on a local operating network, comprising:
   a housing;
   a motion sensing unit located at least partially within said housing;
   an ambient light sensing unit located at least partially within said housing;
   a temperature sensing unit including a temperature sensor, said temperature sensor being positioned within an air chamber in said housing, said air chamber being configured to seal said temperature sensor to prevent air within said housing from contacting said temperature sensor;
   a vent in said housing positioned relative to said air chamber such that air from outside said housing is permitted to diffuse through said vent and contact said temperature sensor;
   load control means for controlling electrical power to be applied to a load bound to the multiple sensor device, said load control means being operable in a plurality of modes, wherein when operating in at least one of said plurality of modes said load control means is responsive to said motion sensing unit and said ambient light sensing unit; and
   communication means for receiving information from one or more electrical devices connected to the local operating network and for transmitting information relative to said motion sensing unit, said ambient light sensing unit and said temperature sensing unit to one or more electrical devices over the local operating network.

2. The multiple sensor device according to claim 1, wherein said motion sensing unit comprises motion sensing circuitry and at least one motion sensor.

3. The multiple sensor device according to claim 2, wherein said motion sensor comprises a passive infrared sensor.

4. The multiple sensor device according to claim 1, wherein said ambient light sensing unit comprises ambient light sensing circuitry and an ambient light sensor.

5. The multiple sensor device according to claim 4, wherein said light sensor comprises a photodiode.

6. The multiple sensor device according to claim 1, wherein said temperature sensing unit comprises temperature sensing circuitry coupled to said temperature sensor.

7. The multiple sensor device according to claim 1, wherein said air chamber is defined by a hollow pedestal having a first end sealed by a printed circuit board and a second end sealed by said temperature sensor and said housing.

8. The multiple sensor device according to claim 7, wherein said housing includes a housing panel and a cover, wherein a portion of said housing panel is positioned to seal said second end of said pedestal and said cover has a cutout portion dimensioned to enclose said temperature sensor when said cover is in contact with said housing panel.

9. The multiple sensor device according to claim 8, wherein said cover incorporates said vent.

10. The multiple sensor device according to claim 1, wherein said load control means comprises a controller.

11. The multiple sensor device according to claim 1, wherein one of said plurality of modes of said load control means comprises a power on/off state for the load.

12. The multiple sensor device according to claim 1, wherein one of said plurality of modes of said load control means comprises illumination control for the load.

13. The multiple sensor device according to claim 12, wherein said illumination control comprises dimming and brightening of the load.

14. The multiple sensor device according to claim 1, wherein said load control means is responsive to said ambient light sensor such that a particular light level within an area is maintained at a predefined level.

15. The multiple sensor device according to claim 1, wherein said load control means further comprises means for inhibiting and overriding a normal operating mode of said multiple sensor device.

16. The multiple sensor device according to claim 1, wherein said load control means monitors said temperature sensing unit and determines the temperature of the area surrounding the multiple sensor device.

17. The multiple sensor device according to claim 16, wherein said load control means generates a warning message in response to detecting rapid increases in temperature and causes said communication means to transmit said warning message on the local operating network.

18. The multiple sensor device according to claim 1, wherein said load control means comprises at least one switch capable of selecting one of said plurality of operating modes of the device.

19. The multiple sensor device according to claim 18, wherein said communication means formats information of said selected operating mode for transmission over the local operating network.

20. The multiple sensor device according to claim 1, wherein said load comprises a lighting load and said load control means comprises at least one switch used to generate control illumination information for said lighting load.

21. The multiple sensor device according to claim 20, wherein said communication means formats said control illumination information for transmission over the local operating network.

22. The multiple sensor device according to claim 1, wherein said communication means comprises a controller and a transceiver.

23. The multiple sensor device according to claim 1 further comprising at least one blinder positioned within said housing and capable of adjusting a field of view of said motion sensing unit.

24. The multiple sensor device according to claim 23, wherein said blinder is movable within said housing.

25. The multiple sensor device according to claim 23, wherein said blinder is translucent.

26. The multiple sensor device according to claim 23, wherein said blinder comprises an shutter portion supported by a lower wall and an upper wall, and a stud that pivotally mounts said blinder in said housing such that said blinder pivots on an axis perpendicular to said stud.

27. The multiple sensor device according to claim 23, wherein said motion sensing unit comprises a motion sensor and said blinder is movable relative to said motion sensor so as to adjust the field of view of said motion sensor.

28. The multiple sensor device according to claim 1 further comprising a plurality of blinders positioned within said housing and capable of adjusting a field of view of said motion sensing unit, and wherein said motion sensing unit comprises a plurality of motion sensors, such that one of said blinders is movable relative to one of said motion sensors so as to adjust the field of view of said motion sensors.

29. An electrical network incorporating multiple sensor devices comprising:
   at least one controllable load;
   a control unit connected to said at least one controllable load via a local operating network; and
   at least one multiple sensing device connected to said control unit via said local operating network, wherein said multiple sensing device includes:
      a housing;
      a motion sensing unit located at least partially within said housing;
      an ambient light sensing unit located at least partially within said housing;
      a temperature sensing unit including a temperature sensor, said temperature sensor being positioned within an air chamber in said housing, said air chamber being configured to seal said temperature sensor to prevent air within said housing from contacting said temperature sensor;
      a vent in said housing positioned relative to said air chamber such that air from outside said housing is permitted to diffuse through said vent and contact said temperature sensor;
      load control means for controlling electrical power to be applied to said at least one controllable load, said load control means being operable in a plurality of modes, wherein when operating in at least one of said plurality of modes said load control means is responsive to said motion sensing unit and said ambient light sensing unit; and
      communication means for receiving information from said control unit and for transmitting information relative to said motion sensing unit, said ambient light sensing unit and said temperature sensing unit to said control unit.

30. The multiple sensor device according to claim 29, wherein said motion sensing unit comprises motion sensing circuitry and at least one motion sensor.

31. The multiple sensor device according to claim 30, wherein said motion sensor comprises a passive infrared sensor.

32. The multiple sensor device according to claim 29, wherein said ambient light sensing unit comprises ambient light sensing circuitry and an ambient light sensor.

33. The multiple sensor device according to claim 32, wherein said light sensor comprises a photodiode.

34. The multiple sensor device according to claim 29, wherein said temperature sensing unit comprises temperature sensing circuitry coupled to said temperature sensor.

35. The multiple sensor device according to claim 29, wherein said air chamber is defined by a hollow pedestal having a first end sealed by a printed circuit board and a second end sealed by said temperature sensor and said housing.

36. The multiple sensor device according to claim 35, wherein said housing includes a housing panel and a cover, wherein a portion of said housing panel is positioned to seal said second end of said pedestal and said cover has a cutout portion dimensioned to enclose said temperature sensor when said cover is in contact with said housing panel.

37. The multiple sensor device according to claim 36, wherein said cover incorporates said vent.

38. The multiple sensor device according to claim 29, wherein one of said plurality of modes of said load control means comprises a power on/off state for said at least one controllable load.

39. The multiple sensor device according to claim 29, wherein one of said plurality of modes of said load control means comprises illumination control for said at least one controllable load.

40. The multiple sensor device according to claim 39, wherein said illumination control comprises dimming and brightening of said at least one controllable load.

41. The multiple sensor device according to claim 29, wherein said load control means is responsive to said ambient light sensor such that a particular light level within an area is maintained at a predefined level.

42. The multiple sensor device according to claim 41, wherein said predefined level is controlled by said control unit.

43. The multiple sensor device according to claim 29, wherein said load control means further comprises means for inhibiting and overriding a normal operating mode of said multiple sensor device.

44. The multiple sensor device according to claim 29, wherein said load control means monitors said temperature sensing unit and determines the temperature of the area surrounding the multiple sensor device.

45. The multiple sensor device according to claim 44, wherein said load control means generates a warning message in response to detecting rapid increases in temperature and causes said communication means to transmit said warning message to said control unit.

46. The multiple sensor device according to claim 29, wherein said local operating network comprises a twisted pair based network.

47. The multiple sensor device according to claim 29, wherein said local operating network comprises an radio frequency based network.

48. The multiple sensor device according to claim 29, wherein said local operating network comprises an infrared based network.

49. The multiple sensor device according to claim 29, wherein said local operating network comprises an optical fiber based network.

50. The multiple sensor device according to claim 29, wherein said local operating network comprises a power line carrier based network.

51. The multiple sensor device according to claim 29, wherein said local operating network comprises a coaxial based network.

52. The multiple sensor device according to claim 29, wherein said local operating network utilizes standard communication protocols.

53. The multiple sensor device according to claim 52, wherein said standard communication protocols comprise LonWorks, CEBus, X10, BACNet and CAN.

54. The multiple sensor device according to claim 29, wherein said communications means comprises a communications transceiver coupled to a controller.

55. The multiple sensor device according to claim 54, wherein said communications transceiver comprises a twisted pair based network transceiver.

56. The multiple sensor device according to claim 54, wherein said communications transceiver comprises a radio frequency based network transceiver.

57. The multiple sensor device according to claim 54, wherein said communications transceiver comprises a power line carrier based network transceiver.

58. The multiple sensor device according to claim 54, wherein said communications transceiver comprises an infrared based network transceiver.

59. The multiple sensor device according to claim 54, wherein said communications transceiver comprises an optical fiber based network transceiver.

60. The multiple sensor device according to claim 54, wherein said communications transceiver comprises a coaxial based network transceiver.

61. The multiple sensor device according to claim 29, wherein said load control means comprises at least one switch capable of selecting one of said plurality of operating modes of the device, and wherein said communication means transmits information of said selected operating mode to said control unit.

62. The multiple sensor device according to claim 29, wherein said load control means comprises a controller.

63. A multiple sensor device for use on a local operating network, comprising:
    motion sensing means for sensing motion within a predefined area;
    ambient light sensing means for measuring light within the predefined area;
    temperature sensing means for sensing temperature within the predefined area;
    means for diffusing ambient air associated with the predefined area toward said temperature sensing means;
    load control means for controlling electrical power to be applied to a load bound to the multiple sensor device, said load control means being operable in a plurality of modes, wherein when operating in at least one of said plurality of modes said load control means is responsive to said motion sensing means and said ambient light sensing means; and
    communication means for receiving information from one or more electrical devices connected to the local operating network and for transmitting information relative to said motion sensing means, said ambient light sensing means and said temperature sensing means to one or more electrical devices over the local operating network.

64. The multiple sensor device according to claim 63, wherein said load control means comprises a controller.

65. The multiple sensor device according to claim 63, wherein said motion sensing means comprises motion sensing circuitry and at least one motion sensor.

66. The multiple sensor device according to claim 63, wherein said motion sensor comprises a passive infrared sensor.

67. The multiple sensor device according to claim 63, wherein said ambient light sensing means comprises ambient light sensing circuitry and an ambient light sensor.

68. The multiple sensor device according to claim 63, wherein said light sensor comprises a photodiode.

69. The multiple sensor device according to claim 63, wherein said temperature sensing means comprises temperature sensing circuitry coupled to said temperature sensor.

70. The multiple sensor device according to claim 69, wherein said air chamber is defined by a hollow pedestal having a first end sealed by a printed circuit board supporting said temperature sensing circuitry and a second end sealed by said temperature sensor and said housing.

71. The multiple sensor device according to claim 70, wherein said housing includes a housing panel and a cover, wherein a portion of said housing panel is positioned to seal said second end of said pedestal and said cover has a cutout portion dimensioned to enclose said temperature sensor when said cover is in contact with said housing panel.

72. The multiple sensor device according to claim 71, wherein said cover incorporates said vent.

73. The multiple sensor device according to claim 63, wherein said load control means comprises at least one switch capable of selecting one of said plurality of operating modes of the device.

74. The multiple sensor device according to claim 73, wherein said communication means formats information of said selected operating mode for transmission over the local operating network.

75. The multiple sensor device according to claim 63, wherein said load comprises a lighting load and said load control means comprises at least one switch used to generate control illumination information for said lighting load.

76. The multiple sensor device according to claim 75, wherein said communication means formats said control illumination information for transmission over the local operating network.

77. The multiple sensor device according to claim 76, wherein said communication means comprises a controller and a transceiver.

78. The multiple sensor device according to claim 63 further comprising at least one blinder positioned within said housing and capable of adjusting a field of view of said motion sensing unit.

79. The multiple sensor device according to claim 78, wherein said blinder is movable within said housing.

80. The multiple sensor device according to claim 78, wherein said blinder is translucent.

81. The multiple sensor device according to claim 78, wherein said blinder comprises an shutter portion supported by a lower wall and an upper wall, and a stud that pivotally mounts said blinder in said housing such that said blinder pivots on an axis perpendicular to said stud.

82. The multiple sensor device according to claim 81, wherein said motion sensing unit comprises a motion sensor and said blinder is movable relative to said motion sensor so as to adjust the field of view of said motion sensor.

83. The multiple sensor device according to claim 63 further comprising a plurality of blinders positioned within said housing and capable of adjusting a field of view of said motion sensing unit, and wherein said motion sensing unit comprises a plurality of motion sensors, such that one of said blinders is movable relative to one of said motion sensors so as to adjust the field of view of said motion sensors.

* * * * *